US012793983B2

(12) United States Patent
Morita et al.

(10) Patent No.: US 12,793,983 B2
(45) Date of Patent: Nov. 10, 2026

(54) CARBON NANOTUBE DISPERSION AND USE THEREOF

(71) Applicants: artience Co., Ltd., Tokyo (JP); TOYOCOLOR CO., LTD., Tokyo (JP)

(72) Inventors: Yu Morita, Tokyo (JP); Naoto Oka, Tokyo (JP); Tetsuro Izumiya, Tokyo (JP); Tomoaki Masuoka, Tokyo (JP)

(73) Assignees: artience Co., Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 647 days.

(21) Appl. No.: 18/021,386

(22) PCT Filed: Oct. 7, 2021

(86) PCT No.: PCT/JP2021/037078
§ 371 (c)(1),
(2) Date: Feb. 14, 2023

(87) PCT Pub. No.: WO2022/075387
PCT Pub. Date: Apr. 14, 2022

(65) Prior Publication Data

US 2023/0307653 A1 Sep. 28, 2023

(30) Foreign Application Priority Data

Oct. 9, 2020 (JP) ................................ 2020-171017
Sep. 30, 2021 (JP) ................................ 2021-160281

(51) Int. Cl.
*H01M 4/62* (2006.01)
*H01M 4/02* (2006.01)

(52) U.S. Cl.
CPC ...... *H01M 4/625* (2013.01); *H01M 2004/021* (2013.01)

(58) Field of Classification Search
CPC ............... C01B 32/174; C01P 2002/82; C01P 2004/62; C01P 2006/12; C01P 2006/22;
(Continued)

(56) References Cited

U.S. PATENT DOCUMENTS 8,992,878 B2 3/2015 Nishino et al.
10,727,477 B2 7/2020 Kim et al.
(Continued)

FOREIGN PATENT DOCUMENTS

CN 102341345 2/2012
CN 105074966 11/2015
(Continued)

OTHER PUBLICATIONS

"Morita et al., JP-2020-105316-A—Machine Translated, Jul. 9, 2020" (Year: 2020).*
(Continued)

*Primary Examiner* — Nicholas P D'Aniello
*Assistant Examiner* — Jesse J Efymow
(74) *Attorney, Agent, or Firm* — JCIPRNET

(57) ABSTRACT

The present disclosure pertains to a carbon nanotube dispersion that contains carbon nanotubes, a dispersing agent, and a solvent, and that satisfies (1)-(4). (1) The ratio of G/D of the carbon nanotubes being 5-100. (2) Not less than 30 parts by mass but less than 250 parts by mass of the dispersing agent being contained with respect to 100 parts by mass of the carbon nanotubes. (3) The complex elastic modulus and the phase angle of the carbon nanotube dispersion at 25° C. and at a frequency of 1 Hz being, not less than 5 Pa but less than 650 Pa, and being not less than 5° but less than 50°, respectively. (4) The BET specific surface area of the carbon nanotubes being 550-1200 $m^2/g$.

11 Claims, 1 Drawing Sheet

(58) Field of Classification Search
CPC ...... C01P 2006/40; C08K 3/04; C08L 101/00; H01M 4/13; H01M 4/139; H01M 4/62; H01M 4/625; H01M 10/052; H01M 2004/021; Y02E 60/10
See application file for complete search history.

(56) References Cited

U.S. PATENT DOCUMENTS

| | | | | |
|---|---|---|---|---|
| 11,108,050 | B2 | 8/2021 | Kim et al. | |
| 2007/0224106 | A1 | 9/2007 | Sakakibara et al. | |
| 2012/0058889 | A1 | 3/2012 | Nishino et al. | |
| 2013/0176659 | A1 * | 7/2013 | Hata | H01G 11/04 361/502 |
| 2016/0020466 | A1 | 1/2016 | Ulbrich et al. | |
| 2016/0315331 | A1 | 10/2016 | Yoshiwara et al. | |
| 2018/0175370 | A1 † | 6/2018 | Kim | |
| 2019/0044150 | A1 * | 2/2019 | Kim | H01M 4/139 |
| 2021/0214229 | A1 | 7/2021 | Morita et al. | |
| 2022/0204857 | A1 * | 6/2022 | Suzuki | C08F 8/48 |
| 2022/0376262 | A1 * | 11/2022 | Morita | H01M 4/625 |
| 2023/0307653 | A1 | 9/2023 | Morita et al. | |

FOREIGN PATENT DOCUMENTS

| | | | |
|---|---|---|---|
| CN | 105814721 | 7/2016 | |
| CN | 107851800 | 3/2018 | |
| CN | 108140841 | 6/2018 | |
| EP | 3333946 | 6/2018 | |
| EP | 3355393 | 8/2018 | |
| EP | 3950108 | 2/2022 | |
| EP | 4050679 | 8/2022 | |
| EP | 4145553 | 3/2023 | |
| JP | 2005162877 | 6/2005 | |
| JP | 2010254546 | 11/2010 | |
| JP | 2011070908 | 4/2011 | |
| JP | 2012221672 | 11/2012 | |
| JP | 2014019619 | 2/2014 | |
| JP | 2018533175 | 11/2018 | |
| JP | 2018534731 | 11/2018 | |
| JP | 2020011872 | 1/2020 | |
| JP | 2020011873 | 1/2020 | |
| JP | 2020105316 | 7/2020 | |
| JP | 2020105316 A * | 7/2020 | |
| KR | 20170069141 | 6/2017 | |
| KR | 20170113250 | 10/2017 | |
| WO | 2017164703 | 9/2017 | |
| WO | WO-2017164703 A1 * | 9/2017 | H01M 4/13 |
| WO | 2019230820 | 12/2019 | |
| WO | 2020203714 | 10/2020 | |
| WO | 2021080006 | 4/2021 | |
| WO | 2022075387 | 4/2022 | |

OTHER PUBLICATIONS

"Office Action of China Counterpart Application", issued on May 21, 2025, with English translation thereof, p. 1-p. 14.
"International Search Report (Form PCT/ISA/210) of PCT/JP2021/037078", mailed on Dec. 14, 2021, with English translation thereof, pp. 1-4.
"Search Report of Europe Counterpart Application", issued on Mar. 24, 2025, p. 1-p. 11.
"Invitation pursuant to Rule 63(1)EPC of Europe Counterpart Application", issued on Nov. 28, 2024, pp. 1-5.
"Office Action of China Counterpart Application", issued on Dec. 20, 2024, with English translation thereof, pp. 1-14.

* cited by examiner
† cited by third party

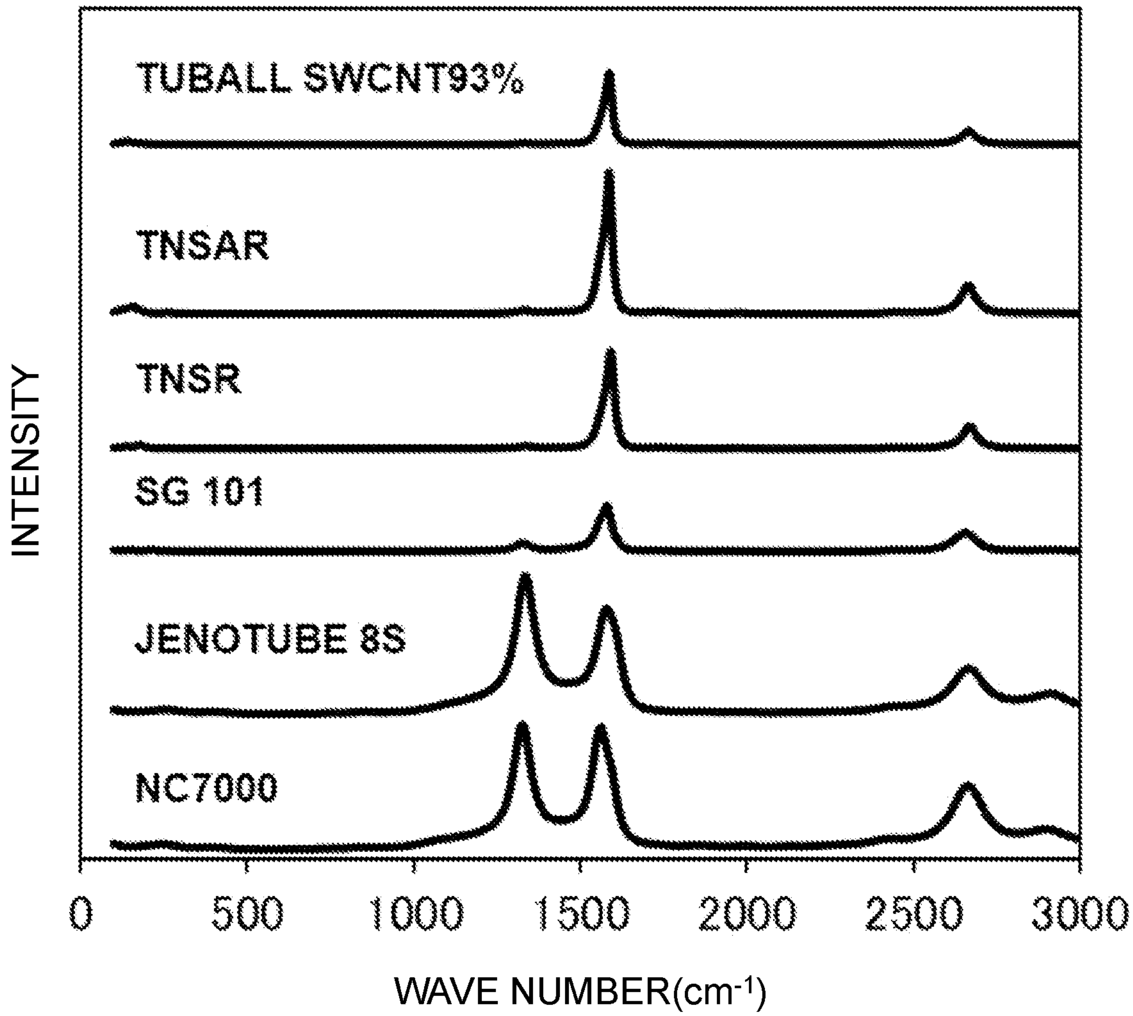
TUBALL SWCNT93%
TNSAR
TNSR
SG 101
JENOTUBE 8S
NC7000
INTENSITY
0
500
1000
1500
2000
2500
3000
WAVE NUMBER(cm-1)

CARBON NANOTUBE DISPERSION AND USE THEREOF

CROSS-REFERENCE TO RELATED APPLICATION

This application is a 371 application of the International PCT application serial no. PCT/JP2021/037078, filed on Oct. 7, 2021, which claims the priority benefits of Japan Patent Application No. 2020-171017, filed on Oct. 9, 2020, and Japan Patent Application No. 2021-160281, filed on Sep. 30, 2021. The entirety of each of the above-mentioned patent applications is hereby incorporated by reference herein and made a part of this specification.

TECHNICAL FIELD

The present invention relates to a carbon nanotube dispersion, and more specifically, relates to a carbon nanotube dispersion, a resin composition containing a carbon nanotube dispersion and a binder, a mixture slurry containing a carbon nanotube dispersion, a binder and an active material, and an electrode film obtained by forming a mixture slurry into a film, and a nonaqueous electrolyte secondary battery containing an electrode film and an electrolyte.

BACKGROUND ART

With the spread of electric vehicles and miniaturization, weight reduction and performance improvement of portable devices, there are demands to provide secondary batteries with high energy densities and to increase the capacity of such secondary batteries. In view of this, nonaqueous electrolyte secondary batteries using a nonaqueous electrolytic solution, particularly, lithium ion secondary batteries, have come to be used in many devices because of their high energy density and high voltage.

As a negative electrode material used in these lithium ion secondary batteries, a carbon material represented by graphite, which has a base potential close to that of lithium (Li) and has a large charging and discharging capacity per unit mass, is used. However, these electrode materials are used with the charging and discharging capacity per mass close to the theoretical value, and the energy density per mass of the battery is approaching its limit. Therefore, in order to increase the utilization rate of the electrode, there have been attempts to reduce the amount of conductivity aids or binders that do not contribute to the discharging capacity.

Carbon black, ketjen black, fullerene, graphene, fine carbon materials and the like are used as conductivity aids. Particularly, carbon nanotubes, which are a type of fine carbon fibers, are often used. For example, it is known that, when carbon nanotubes are added to graphite or silicon negative electrodes, the conductivity of the electrode, the strength of the electrode such as adhesion and expansion and contraction, and the rate property and the cycle property of the lithium ion secondary battery are improved (for example, refer to Patent Literature 1). In addition, studies are being conducted to reduce the electrode resistance by adding carbon nanotubes to the positive electrode (for example, refer to Patent Literature 2 and Patent Literature 3). Among these, multi-walled carbon nanotubes having an outer diameter of 10 nm to several tens of 10 nm are relatively inexpensive and are expected to be put into practice.

When carbon nanotubes having a small average outer diameter are used, a conductive network can be efficiently formed with a small amount of carbon nanotubes, and the amount of conductivity aid contained in the positive electrode and negative electrode for the lithium ion secondary battery can be reduced. In addition, it is known that the same effects can be obtained when carbon nanotubes having a long fiber length are used (for example, refer to Patent Literature 4).

In addition, methods of stabilizing dispersion of carbon nanotubes using various dispersing agents have been proposed. For example, dispersion in water and N-methyl-2-pyrrolidone (NMP) using a polymer-based dispersing agent such as a water-soluble polymer has been proposed (refer to Patent Literature 1, Patent Literature 5 and Patent Literature 6). In addition, a method of stabilizing dispersion of multi-walled carbon nanotubes using nitrile rubber as a dispersing agent has been proposed (refer to Patent Literature 7).

CITATION LIST

Patent Literature

[Patent Literature 1]
Japanese Patent Laid-Open No. 2020-105316
[Patent Literature 2]
Japanese Patent Laid-Open No. 2011-70908
[Patent Literature 3]
Japanese Patent Laid-Open No. 2014-19619
[Patent Literature 4]
Japanese Patent Laid-Open No. 2012-221672
[Patent Literature 5]
Japanese Patent Laid-Open No. 2010-254546
[Patent Literature 6]
Japanese Patent Laid-Open No. 2005-162877
[Patent Literature 7]
Published Japanese Translation No. 2018-533175 of the PCT International Publication

SUMMARY OF INVENTION

Technical Problem

However, carbon nanotubes having features of a small average outer diameter and a large fiber length have a strong cohesive force and are unlikely to disperse, and therefore a carbon nanotube dispersion having sufficient dispersibility cannot be obtained. In Patent Literature 1, single-walled carbon nanotubes are dispersed in an NMP solvent containing polyvinylpyrrolidone using zirconia beads, but there are problems such as a long dispersion time and a small dispersed particle size of carbon nanotubes, and although the conductivity of the electrode is improved, the electrode strength cannot be more sufficiently improved. In Patent Literature 5, oxidized double-walled carbon nanotubes are dispersed in a carboxymethyl cellulose aqueous solution using an ultrasonic homogenizer, but it is difficult to disperse carbon nanotubes in a solvent at a high concentration. In addition, in Patent Literature 6, single-walled carbon nanotubes are dispersed in an NMP solvent containing polyvinylpyrrolidone using ultrasonic waves, but it is difficult to disperse carbon nanotubes in a solvent at a high concentration. In Patent Literature 7, it has been proposed that, when a multi-walled carbon nanotube dispersion having a specific complex elastic modulus is produced, the output property of the electrode is improved. However, in multi-walled carbon nanotubes having an outer diameter of 10 nm or more, improvement in the electrode strength was insufficient, and improvement in the cycle property of the lithium ion secondary battery was difficult. Therefore, obtaining a carbon nanotube dispersion in which carbon nanotubes, which are fine carbon fibers, particularly, single-walled carbon nanotubes, are uniformly dispersed in a dispersion medium at a high concentration is an important issue for more applications.

An objective achieved by the present invention is to provide a carbon nanotube dispersion having a high dispersibility and elastic modulus, a carbon nanotube resin composition and a mixture slurry in order to obtain an electrode film having excellent electrode strength and conductivity, and more specifically, to provide a nonaqueous electrolyte secondary battery having an excellent rate property and cycle property.

Solution to Problem

That is, the present invention relates to a carbon nanotube dispersion containing carbon nanotubes, a dispersing agent, and a solvent, which is a carbon nanotube dispersion that satisfies the following (1) to (4):

(1) in Raman spectrums of carbon nanotubes, when the maximum peak intensity in a range of 1,560 to 1,600 $cm^{-1}$ is G, and the maximum peak intensity in a range of 1,310 to 1,350 $cm^{-1}$ is D, the G/D ratio of the carbon nanotubes is 5 to 100;

(2) the content of the dispersing agent with respect to 100 parts by mass of the carbon nanotubes is 30 parts by mass or more and less than 250 parts by mass;

(3) the complex elastic modulus of the carbon nanotube dispersion at 25° C. and a frequency of 1 Hz is 5 Pa or more and less than 650 Pa, and the phase angle is 5° or more and less than 50°; and (4) the BET specific surface area of the carbon nanotubes is 550 to 1,200 $m^2/g$.

In addition, the present invention relates to the carbon nanotube dispersion in which, in Raman spectrums of carbon nanotubes, when the maximum peak intensity in a range of 1,560 to 1,600 $cm^{-1}$ is G, and the maximum peak intensity in a range of 1,310 to 1,350 $cm^{-1}$ is D, the G/D ratio of the carbon nanotubes is 10 to 50.

In addition, the present invention relates to the carbon nanotube dispersion in which, when the shear rate of 1 ($s^{-1}$) of the carbon nanotube dispersion at 25° C. is measured using a rheometer, it is 5 Pa·s or more and less than 40 Pa·s.

In addition, the present invention relates to the carbon nanotube dispersion in which the cumulative particle size D10 measured by a dynamic light scattering method is 200 nm or more and less than 500 nm.

In addition, the present invention relates to the carbon nanotube dispersion in which the volume resistivity of the carbon nanotubes is $1.0\times10^{-3}$ Ω·cm to $1.0\times10^{-2}$ Ω·cm.

In addition, the present invention relates to the carbon nanotube dispersion in which the cumulative particle size D50 measured by a dynamic light scattering method is 500 nm or more and less than 3,000 nm.

In addition, the present invention relates to the carbon nanotube dispersion in which the weight average molecular weight of the dispersing agent is 10,000 to 100,000.

In addition, the present invention relates to the carbon nanotube dispersion in which the solvent includes water.

In addition, the present invention relates to a carbon nanotube resin composition containing the carbon nanotube dispersion and a binder.

In addition, the present invention relates to a mixture slurry containing the carbon nanotube resin composition and an active material.

In addition, the present invention relates to an electrode film which is a coating film of the mixture slurry.

In addition, the present invention relates to a nonaqueous electrolyte secondary battery including a positive electrode, a negative electrode, and an electrolyte, which is a nonaqueous electrolyte secondary battery in which at least one of the positive electrode and the negative electrode includes the electrode film.

Advantageous Effects of Invention

A resin composition, a mixture slurry, and an electrode film which have an excellent electrode strength and adhesion can be obtained when the carbon nanotube dispersion of the present invention is used. In addition, a nonaqueous electrolyte secondary battery having an excellent rate property and cycle property can be obtained. Therefore, the carbon nanotube dispersion of the present invention can be used in various application fields for which high conductivity and durability are required.

BRIEF DESCRIPTION OF DRAWINGS

FIGURE is a graph showing Raman spectrums of carbon nanotubes used in examples and comparative examples of the present invention.

DESCRIPTION OF EMBODIMENTS

Hereinafter, a carbon nanotube dispersion, a resin composition, a mixture slurry, an electrode film as a coating film thereof, and a nonaqueous electrolyte secondary battery of the present invention will be described in detail.

(1) Carbon Nanotube

The carbon nanotube of the present embodiment is preferably a single-walled carbon nanotube. A mixture of a single-walled carbon nanotube and a multi-walled carbon nanotube may be used. The single-walled carbon nanotube has a structure in which one graphite layer is wound, and the multi-walled carbon nanotube has a structure in which two, three or more graphite layers are wound.

The average outer diameter of the carbon nanotubes of the present embodiment is 0.5 nm to 5 nm, preferably 1 nm to 3 nm, and more preferably 1 nm to 2 nm. The average outer diameter of the carbon nanotubes can be obtained by observing the morphology of carbon nanotubes using a transmission electron microscope (commercially available from JEOL Ltd.), measuring the lengths of 100 minor axes, and calculating the number average value thereof.

The BET specific surface area of the carbon nanotubes of the present embodiment is 550 $m^2/g$ to 1,200 $m^2/g$, preferably 600 to 1,200 $m^2/g$, more preferably 800 $m^2/g$ to 1,200 $m^2/g$, and still more preferably 800 $m^2/g$ to 1,000 $m^2/g$.

In the carbon nanotubes of the present embodiment, in the Raman spectrum, the G/D ratio is 5 to 100, more preferably 10 to 50, and still more preferably 20 to 50 when the maximum peak intensity in a range of 1,560 to 1,600 $cm^{-1}$ is G, and the maximum peak intensity in a range of 1,310 to 1,350 $cm^{-1}$ is D. The Raman spectrum can be measured using a laser beam with a wavelength of 532 nm according to Raman spectroscopy.

The volume resistivity of the carbon nanotubes of the present embodiment is preferably $1.0\times10^{-3}$ Ω·cm to $3.0\times10^{-2}$ Ω·cm and more preferably $1.0\times10^{-3}$ Ω·cm to $1.0\times10^{-2}$ Ω·cm. The volume resistivity of the carbon nanotubes can be measured using a powder resistivity measure device (Loresta GP powder resistivity measurement system MCP-PD-51, commercially available from Mitsubishi Chemical Analytech Co., Ltd.).

The carbon purity of the carbon nanotubes of the present embodiment is expressed by the content (%) of carbon atoms in the carbon nanotubes. The carbon purity with respect to 100 mass % of the carbon nanotubes is preferably 80 mass % or more, more preferably 90 mass % or more, and still more preferably 95 mass % or more.

The amount of metals contained in the carbon nanotubes of the present embodiment with respect to 100 mass % of the carbon nanotubes is preferably less than 20 mass %, more preferably less than 10 mass %, and still more preferably less than 5 mass %. Examples of metals contained in carbon nanotubes include metals and metal oxides used as a catalyst when carbon nanotubes are synthesized. Specific examples thereof include metals such as cobalt, nickel, aluminum, magnesium, silica, manganese, and molybdenum, alloys of these metals, metal oxides of these metals, and composite oxides of these metals.

The carbon nanotubes of the present embodiment may be surface-treated carbon nanotubes. In addition, the carbon nanotubes may be carbon nanotube derivatives to which a functional group represented by a carboxyl group is added. In addition, carbon nanotubes containing substances represented by organic compounds, metal atoms, or fullerenes can be used.

The carbon nanotubes of the present embodiment may be pulverized carbon nanotubes. The pulverization treatment is pulverization of carbon nanotubes without substantial intervention of a liquid substance using a pulverizer with a built-in pulverization medium such as beads and steel balls, and is also called dry pulverization. Pulverization is performed by utilizing a pulverizing force and a destructive force due to collision between pulverization media. Pulverization mainly has an effect of reducing the number of secondary particles of carbon nanotubes, and can improve the dispersibility of carbon nanotubes. As a dry pulverization device, a known method using a dry attritor, a ball mill, a vibration mill, a bead mill or the like can be used, and the pulverization time can be arbitrarily set depending on the device.

The carbon nanotubes of the present embodiment may be carbon nanotubes produced by any method. Carbon nanotubes can be generally produced by a laser ablation method, an arc discharging method, a thermal CVD method, a plasma CVD method and a combustion method, but the present invention is not limited thereto.

(2) Dispersing Agent

The dispersing agent of the present embodiment is not particularly limited as long as it can stabilize dispersion of carbon nanotubes, and a surfactant and a resin type dispersing agent can be used. Surfactants are mainly classified into anionic surfactants, cationic surfactants, nonionic surfactants and amphoteric surfactants. A suitable type of dispersing agent can be appropriately used in a suitable blending amount depending on properties required for dispersing carbon nanotubes.

When an anionic surfactant is selected, the type thereof is not particularly limited. Specific examples thereof include fatty acid salts, polysulfonates, polycarboxylates, alkyl sulfate ester salts, alkyl aryl sulfonates, alkyl naphthalene sulfonates, dialkyl sulfonates, dialkyl sulfosuccinates, alkyl phosphates, polyoxyethylene alkyl ether sulfates, polyoxyethylene alkyl aryl ether sulfates, naphthalenesulfonic acid formalin condensates, polyoxyethylene alkyl phosphate sulfonates, glycerol borate fatty acid esters and polyoxyethylene glycerol fatty acid esters, but the present invention is not limited thereto. More specific examples thereof include sodium dodecylbenzenesulfonate, sodium lauryl sulfate, sodium polyoxyethylene lauryl ether sulfate, polyoxyethylene nonylphenyl ether sulfate salts and sodium salts of β-naphthalenesulfonic acid formalin condensate, but the present invention is not limited thereto.

In addition, cationic surfactants include alkylamine salts and quaternary ammonium salts. Specific examples thereof include stearylamine acetate, coconut trimethyl ammonium chloride, tallow trimethyl ammonium chloride, dimethyl dioleyl ammonium chloride, methyloleyldiethanol chloride, tetramethyl ammonium chloride, lauryl pyridinium chloride, lauryl pyridinium bromide, lauryl pyridinium disulfate, cetylpyridinium bromide, 4-alkylmercaptopyridine, poly(vinylpyridine)-dodecyl bromide and dodecylbenzyltriethylammonium chloride, but the present invention is not limited thereto. In addition, examples of amphoteric surfactants include aminocarboxylates, but the present invention is not limited thereto.

In addition, examples of nonionic surfactants include polyoxyethylene alkyl ethers, polyoxyalkylene derivatives, polyoxyethylene phenyl ethers, sorbitan fatty acid esters, polyoxyethylene sorbitan fatty acid esters and alkyl allyl ethers, but the present invention is not limited thereto. Specific examples thereof include polyoxyethylene lauryl ethers, sorbitan fatty acid esters and polyoxyethylene octylphenyl ethers, but the present invention is not limited thereto.

The selected surfactant is not limited to a single surfactant. Therefore, it is possible to use a combination of two or more surfactants. For example, a combination of an anionic surfactant and a nonionic surfactant or a combination of a cationic surfactant and a nonionic surfactant can be used. The blending amount in this case is preferably a blending amount suitable for each surfactant component. As the combination, a combination of an anionic surfactant and a nonionic surfactant is preferable. The anionic surfactant is preferably a polycarboxylate. The nonionic surfactant is preferably polyoxyethylene phenyl ether.

In addition, specific examples of resin type dispersing agents include cellulose derivatives (cellulose acetate, cellulose acetate butyrate, cellulose butyrate, cyanoethyl cellulose, ethyl hydroxyethyl cellulose, nitro cellulose, methyl cellulose, ethyl cellulose, hydroxyethyl cellulose, hydroxypropyl cellulose, hydroxypropyl methyl cellulose, carboxymethyl cellulose, etc.), polyvinyl alcohol, polyvinyl butyral, polyvinylpyrrolidone, and polyacrylonitrile polymers. Particularly, methyl cellulose, ethyl cellulose, carboxymethyl cellulose, polyvinyl alcohol, polyvinyl butyral, polyvinylpyrrolidone, and polyacrylonitrile polymers are preferable.

Carboxymethyl cellulose as a resin type dispersing agent can be used in the form of a salt such as a sodium salt of carboxymethyl cellulose in which hydroxy groups of carboxymethyl cellulose are replaced with carboxymethyl sodium groups. The degree of etherification of carboxymethyl cellulose as a resin type dispersing agent is preferably 0.5 to 1.5 and more preferably 0.6 to 1.0. The degree of etherification of carboxymethyl cellulose can be measured according to a general method, and specifically, can be measured according to the method described in examples.

The dispersing agent of the present embodiment has a weight average molecular weight in terms of pullulan that is preferably 5,000 or more and 300,000 or less, more preferably 10,000 or more and 100,000 or less, and still more preferably 10,000 or more and 50,000 or less. When a dispersing agent having an appropriate weight average molecular weight is used, the adsorption to carbon nanotubes is improved, and the stability of the carbon nanotube dispersion is further improved. In addition, when a dispersing agent having a weight average molecular weight exceeding the above range is used, the viscosity of the carbon nanotube dispersion increases, and when a disperser such as a nozzle type high pressure homogenizer in which a liquid to be dispersed passes through a narrow flow path is used, the dispersion efficiency may decrease. Here, the resin type dispersing agent may have a binding ability in addition to the dispersing ability, and the above resin type dispersing agent can be used as a binder, and, the same type of resin as the resin type dispersing agent may be used as the binder. When the same type of resin as the resin type dispersing agent is used as the binder, it is preferable to use a resin having a weight average molecular weight larger than the weight average molecular weight of the resin type dispersing agent.

Here, the weight average molecular weight (Mw) of the dispersing agent can be measured using gel permeation chromatography (GPC) with a differential refractive index (RI) detector, and is a pullulan conversion value.

In addition, in addition to the dispersing agent of the present embodiment, an inorganic base and/or inorganic metal salt may be included. The inorganic bases and inorganic metal salts are preferably compounds containing at least one of alkali metals and alkaline earth metals, and specific examples thereof include chlorides, hydroxides, carbonates, nitrates, sulfates, phosphates, tungstates, vanadates, molybdates, niobates, and borates of alkali metals and alkaline earth metals. In addition, among these, chlorides, hydroxides, and carbonates of alkali metals and alkaline earth metals are preferable because they can easily supply cations. Examples of alkali metal hydroxides include lithium hydroxide, sodium hydroxide, and potassium hydroxide. Examples of alkaline earth metal hydroxides include calcium hydroxide and magnesium hydroxide. Examples of alkali metal carbonates include lithium carbonate, lithium hydrogencarbonate, sodium carbonate, sodium hydrogen carbonate, potassium carbonate, and potassium hydrogen carbonate. Examples of alkaline earth metal carbonates include calcium carbonate and magnesium carbonate. Among these, lithium hydroxide, sodium hydroxide, lithium carbonate, and sodium carbonate are more preferable.

In addition, in addition to the dispersing agent of the present embodiment, an acid may be included. When an acid is added, the charging state in the dispersion system and the balance between the hydrophilic part and the hydrophobic part change, and the dispersibility may be improved. The type of acid is not particularly limited, and one type may be used or a plurality of types may be used in combination. Examples of acids include oxalic acid, lactic acid, citric acid, polyacrylic acid, polystyrene sulfonic acid, acetic acid, malonic acid, hydrochloric acid, nitric acid, sulfuric acid, boric acid, and phosphoric acid.

In addition, in addition to the dispersing agent of the present embodiment, a defoaming agent may be included. The defoaming agent can be arbitrarily used as long as it has a defoaming effect such as commercially available defoaming agents, wetting agents, hydrophilic organic solvents, and water-soluble organic solvents, and one type thereof may be used or a plurality thereof may be used in combination.

Examples thereof include alcohols such as ethanol, propanol, isopropanol, butanol, octyl alcohol, hexadecyl alcohol, acetylene alcohol, ethylene glycol monobutyl ether, methyl cellosolve, butyl cellosolve, propylene glycol monomethyl ether, acetylene glycol, polyoxyalkylene glycol, propylene glycol, and other glycols, fatty acid esters such as diethylene glycol laurate, glycerin monoricinoleate, alkenylsuccinic acid derivatives, sorbitol monolaurate, sorbitol trioleate, polyoxyethylene monolaurate, polyoxyethylene sorbitol monolaurate, and natural wax, amides such as polyoxyalkyleneamide and acrylate polyamine, phosphate esters such as tributyl phosphate and sodium octyl phosphate, metallic soaps such as aluminum stearate and calcium oleate, fats and oils such as animal and vegetable oils, sesame oil, and castor oil mineral oils such as kerosene and paraffin, and silicones such as dimethyl silicone oil, silicone paste, silicone emulsion, organic modified polysiloxane, and fluorosilicone oil.

(3) Solvent

The solvent of the present embodiment is not particularly limited as long as carbon nanotubes can be dispersed, but any one selected from the group consisting of water and a water-soluble organic solvent or a mixed solvent containing two or more selected from the groups is preferable, and it is more preferable to contain water. When water is contained, its content with respect to 100 mass % of the solvent is preferably 95 mass % or more and more preferably 98 mass % or more, and a single water solvent may be used.

Examples of water-soluble organic solvents include alcohols (methanol, ethanol, propanol, isopropanol, butanol, isobutanol, secondary butanol, tertiary butanol, benzyl alcohol, etc.), polyhydric alcohols (ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, etc.), polyhydric alcohol ethers (ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monobutyl ether, ethylene glycol monomethyl ether acetate, triethylene glycol monomethyl ether, triethylene glycol monoethyl ether, triethylene glycol monobutyl ether, ethylene glycol monophenyl ether, propylene glycol monophenyl ether, etc.), amines (ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, tetramethyl propylene diamine, etc.), amides (N-methyl-2-pyrrolidone (NMP), N-ethyl-2-pyrrolidone (NEP), N,N-dimethylformamide, N,N-dimethylacetamide, N,N-diethylacetamide, N-methylcaprolactam, etc.), heterocycles (cyclohexylpyrrolidone, 2-oxazolidone, 1,3-dimethyl-2-imidazolidinone, γ-butyrolactone, etc.), sulfoxides (dimethyl sulfoxide, etc.), sulfones (hexamethylphosphorotriamide, sulfolane, etc.), lower ketones (acetone, methyl ethyl ketone, etc.), and in addition, tetrahydrofuran, urea, acetonitrile and the like can be used. Among these, an amide-based water-soluble organic solvent is preferable, and N-methyl-2-pyrrolidone (NMP) is more preferable.

(4) Carbon Nanotube Dispersion

The carbon nanotube dispersion of the present embodiment contains carbon nanotubes, a dispersing agent and a solvent.

The complex elastic modulus of the carbon nanotube dispersion of the present embodiment at 25° C. and a frequency of 1 Hz is 5 Pa or more and less than 650 Pa, preferably 5 Pa or more and less than 400 Pa, and more preferably 10 Pa or more and less than 400 Pa. The complex elastic modulus of the carbon nanotube dispersion indicates the hardness of the carbon nanotube dispersion, and tends to be smaller as the dispersibility of carbon nanotubes is better and the viscosity of the carbon nanotube dispersion is lower. On the other hand, when the fiber length of carbon nanotubes is long, even if dispersion is favorable, the complex elastic modulus may become a high numerical value due to the structural viscosity of the carbon nanotube itself.

The phase angle of the carbon nanotube dispersion of the present embodiment at 25° C. and a frequency of 1 Hz is 5° or more and less than 50°, and more preferably 10° or more and less than 50°. The phase angle means the phase shift of the stress wave when the strain applied to the carbon nanotube dispersion is a sine wave. In the case of a purely elastic component, since the sine wave has the same phase as the applied strain, the phase angle is 0°. On the other hand, in a purely viscous component, the stress wave advances by 90°. A carbon nanotube dispersion component having complex elastic modulus and phase angle values within the above ranges has a favorable dispersed particle size and dispersion state of carbon nanotubes, and is suitable as a carbon nanotube dispersion for improving the electrode strength and conductivity.

The complex elastic modulus and the phase angle of the carbon nanotube dispersion can be obtained by performing dynamic viscoelasticity measurement using a rheometer with a cone of a diameter of 35 mm and 2° at 25° C. and a frequency of 1 Hz with a strain rate in the range of 0.01% to 5%. When the measured value contains a decimal point, it is rounded to an integer according to the rule B of JIS 28401: 1999. Here, when the measured value is one decimal place, the complex elastic modulus of the carbon nanotube dispersion at 25° C. and a frequency of 1 Hz is preferably 4.5 Pa or more and less than 650.4 Pa, and the phase angle of the carbon nanotube dispersion at 25° C. and a frequency of 1 Hz is preferably 4.5° or more and less than 50.4°.

A developed conductive network is formed by uniformly and favorably dispersing the carbon nanotubes while maintaining a certain length or longer so that the fiber length of the carbon nanotubes is not shortened by breakage. Therefore, it is not enough that the viscosity of the conductive material dispersion component is simply low and the (apparent) dispersibility is favorable, but it is particularly effective to determine the dispersion state by combining the complex elastic modulus and/or the phase angle with a conventional index such as viscosity. When the complex elastic modulus and/or the phase angle are within the above range, a conductive material dispersion component having favorable conductivity and electrode strength can be obtained.

The viscosity of the carbon nanotube dispersion of the present embodiment when measured using a rheometer at 25° C. and a shear rate of 1 ($s^{-1}$) is preferably 5 Pa·s or more and less than 60 Pa·s, more preferably 10 Pa·s or more and less than 40 Pa·s, and still more preferably 20 Pa·s or more and less than 40 Pa·s. In addition, when the viscosity is measured using a rheometer at 25° C. and a shear rate of 10 ($s^{-1}$), it is preferably 1 Pa·s or more and less than 10 Pa·s. When the shear viscosity at a shear rate of 1 ($s^{-1}$) is measured, the dispersibility of the carbon nanotube dispersion can be determined, the carbon nanotube dispersion within the above range has a favorable dispersed particle size and dispersion state of the carbon nanotubes, and is suitable as a carbon nanotube dispersion for improving the electrode strength and conductivity.

The viscosity of the carbon nanotube dispersion can be obtained by leaving the carbon nanotube dispersion in a thermostatic chamber at 25° C. for 1 hour or longer, then sufficiently stirring the carbon nanotube dispersion, and measuring the shear viscosity at 25° C., a shear rate of 1 $s^{-1}$ and 10 $s^{-1}$ using a rheometer with a cone of a diameter of 35 mm and 2°. When the measured value contains a decimal point, it is rounded to an integer according to the rule B of JIS 28401: 1999.

The cumulative particle size D10 of the carbon nanotube dispersion of the present embodiment measured by a dynamic light scattering method is preferably 200 nm or more and less than 500 nm, more preferably 200 nm or more and less than 400 nm, and still more preferably 300 nm or more and less than 400 nm. In addition, the cumulative particle size D50 of the carbon nanotube dispersion measured by a dynamic light scattering method is preferably 500 nm or more and less than 3,000 nm, more preferably 500 nm or more and less than 2,000 nm, and still more preferably 500 nm or more and less than 1,500 nm. The cumulative particle sizes D10 and D50 of the carbon nanotube dispersion can be measured using a particle size distribution meter (Nanotrac UPA, model UPA-EX, commercially available from MicrotracBel Corp.). The particle size measured by a dynamic light scattering method has a correlation with the fiber length of the carbon nanotubes, and the carbon nanotube dispersion having a cumulative particle size D10 within the above range has a favorable dispersion state of the carbon nanotubes in the dispersion.

In order to obtain the carbon nanotube dispersion of the present embodiment, it is preferable to perform a treatment of dispersing carbon nanotubes in a solvent. The dispersing device used for such a treatment is not particularly limited.

As the dispersing device, a disperser that is generally used for pigment dispersion or the like can be used. Examples thereof include mixers such as a disper, a homomixer, and a planetary mixer, media type dispersers such as homogenizers (Advanced Digital Sonifer (registered trademark), MODEL 450DA, commercially available from BRANSON, "ClearMix," commercially available from M Technique Co., Ltd., "Filmix" and the like, commercially available from PRIMIX, "Abramix" and the like, commercially available from Silverson Co., Ltd.), paint conditioners (commercially available from Red Devil), Colloid Mill ("PUC Colloid Mill," commercially available from PUC, "Colloid Mill MK," commercially available from IKA), Cone Mill ("Cone Mill MKO" and the like, commercially available from IKA), ball mill, sand mill ("Dyno-Mill," commercially available from Shinmaru Enterprises Corporation), attritor, pearl mill ("DCP mill" and the like, commercially available from Nippon Eirich Co., Ltd.), and coball mill, medialess dispersers such as wet jet mills ("Genas PY," commercially available from Genas, "Starburst," commercially available from Sugino Machine Ltd., and "Nanomizer" and the like, commercially available from Nanomizer Inc.), "Clear SS-5," commercially available from M Technique Co., Ltd. and MICROS," commercially available from Nara Machinery Co., Ltd., and other roll mills, but the present invention is not limited thereto.

Thea amount of carbon nanotubes in the carbon nanotube dispersion of the present embodiment with respect to 100 parts by mass of the carbon nanotube dispersion is preferably 0.2 parts by mass to 1.5 parts by mass, more preferably 0.4 parts by mass to 1.2 parts by mass, and still more preferably 0.4 parts by mass to 1.0 part by mass.

The amount of the dispersing agent used in the carbon nanotube dispersion of the present embodiment with respect to 100 parts by mass of the carbon nanotubes is preferably 30 parts by mass to 250 parts by mass use, more preferably 50 parts by mass to 150 parts by mass use, and still more preferably 50 parts by mass to 100 parts by mass.

The pH of the carbon nanotube dispersion of the present embodiment is preferably 6 to 11, more preferably 7 to 11, still more preferably 8 to 11, and particularly preferably 9 to 11. The pH of the carbon nanotube dispersion can be measured using a pH meter (pH METER F-52, commercially available from HORIBA, Ltd.).

(5) Binder

The binder is a resin that binds substances such as carbon nanotubes.

Examples of binders of the present embodiment include polymers or copolymers containing ethylene, propylene, vinyl chloride, vinyl acetate, vinyl alcohol, maleic acid, acrylic acid, acrylic acid ester, methacrylic acid, methacrylic acid ester, acrylonitrile, styrene, vinyl butyral, vinyl acetal, vinylpyrrolidone or the like as a constituent unit; polyurethane resins, polyester resins, phenol resins, epoxy resins, phenoxy resins, urea resins, melamine resins, alkyd resins, acrylic resins, formaldehyde resins, silicone resins, and fluorine resins; cellulose resins such as carboxymethyl cellulose; rubbers such as styrene butadiene rubber and fluorine rubber; and conductive resins such as polyaniline and polyacetylene. In addition, modified products, mixtures, and copolymers of these resins may be used. Among these, polyvinylidene fluoride, polyvinyl fluoride, tetrafluoroethylene, carboxymethyl cellulose, styrene butadiene rubber, and polyacrylic acid are preferable.

Carboxymethyl cellulose as a binder preferably has a high viscosity, and for example, when a 1% aqueous solution is produced, the viscosity is preferably 500 to 6,000 m Pa·s, and more preferably 1,000 to 3,000 m Pa·s. The viscosity of a 1% aqueous solution containing carboxymethyl cellulose can be measured under a condition at 25° C. using a B type viscometer rotor at a rotation speed of 60 rpm.

Carboxymethyl cellulose as a binder preferably has a high degree of etherification. For example, the degree of etherification is preferably 0.6 to 1.5, more preferably 0.6 to 1.2, and still more preferably 0.8 to 1.2.

When the mass of the active material is set as 100 mass %, the amount of the binder in the mixture slurry of the present embodiment is preferably 0.5 to 30 mass %, more preferably 1 to 25 mass %, and particularly preferably 2 to 20 mass %. In addition, the type and amount ratio of the binders are appropriately selected according to properties of coexisting substances such as carbon nanotubes and active materials. For example, in the mixture slurry, regarding the amount of carboxymethyl cellulose used as a binder, when the mass of the active material is set as 100 mass %, the proportion of carboxymethyl cellulose is preferably 0.5 to 3.0 mass %, and more preferably 1.0 to 2.0 mass %.

Styrene butadiene rubber that is generally used as a binding material for an electrode can be used as long as it is an oil-in-water emulsion. In the mixture slurry, regarding the amount of styrene butadiene rubber used as a binder, when the mass of the active material is set as 100 mass %, the proportion of styrene butadiene rubber is preferably 0.5 to 3.0 mass % and more preferably 1.0 to 2.0 mass %.

In the mixture slurry, regarding the amount of polyacrylic acid used as a binder, when the mass of the active material is set as 100 mass %, the proportion of polyacrylic acid is preferably 1 to 25 mass %, and more preferably 5 to 20 mass %.

In the mixture slurry, regarding the amount of polyvinylidene fluoride used as a binder, when the mass of the active material is set as 100 mass %, the proportion of polyvinylidene fluoride is preferably 1 to 10 mass %, and more preferably 1 to 5 mass %.

(6) Carbon Nanotube Resin Composition

The carbon nanotube resin composition of the present embodiment contains carbon nanotubes, a dispersing agent, a solvent and a binder.

In order to obtain the carbon nanotube resin composition of the present embodiment, it is preferable to mix the carbon nanotube dispersion and the binder and homogenize the mixture. As a mixing method, various conventionally known methods can be used. The carbon nanotube resin composition can be produced using the dispersing device described above for the carbon nanotube dispersion.

(7) Mixture Slurry

The mixture slurry of the present embodiment contains carbon nanotubes, a dispersing agent, a solvent, a binder and an active material.

<Active Material>

The active material of the present embodiment is a material that serves as a basis for the battery reaction. Active materials are classified into a positive electrode active material and a negative electrode active material according to the electromotive force.

The positive electrode active material is not particularly limited, but metal compounds such as metal oxides and metal sulfides that can dope or intercalate lithium ions, conductive polymers and the like can be used. Examples thereof include oxides of transition metals such as Fe, Co, Ni, and Mn, composite oxides with lithium, and inorganic compounds such as transition metal sulfides. Specific examples thereof include transition metal oxide powders such as MnO, $V_2O_5$, $V_6O_{13}$, and $TiO_2$, composite oxide powders of lithium such as layered-structure lithium nickelate, lithium cobaltate, lithium manganate, and spinel-structure lithium manganite and transition metals, and transition metal sulfide powders such as a lithium iron phosphate material which is an olivine-structure phosphate compound, $TiS_2$, and FeS. In addition, conductive polymers such as polyaniline, polyacetylene, polypyrrole, and polythiophene can be used. In addition, mixtures of the above inorganic compounds or organic compounds may be used.

The negative electrode active material is not particularly limited as long as it can dope or intercalate lithium ions. Examples thereof include metal Li, and its alloys such as tin alloys, silicon alloys, and lead alloys, metal oxide materials such as $Li_xFe_2O_3$, $Li_xFe_3O_4$, $Li_xWO_2$ (x is a number of $0<x<1$), lithium titanate, lithium vanadate, and lithium silicate, conductive polymer materials such as polyacetylene and poly-p-phenylene, amorphous carbonaceous materials such as soft carbon and hard carbon, carbonaceous powders such as artificial graphite such as highly-graphitized carbon materials and natural graphite, and carbon-based materials such as carbon black, mesophase carbon black, resin-baked carbon materials, air-grown carbon fibers, and carbon fibers. These negative electrode active materials can be used alone or a plurality thereof can be used in combination.

A silicon-based negative electrode active material is preferable as the negative electrode active material of the present embodiment. Specifically, a negative electrode active material containing silicon such as a silicon alloy and a lithium silicate is preferable.

As the silicon-based negative electrode active material, examples thereof include so-called metallurgical grade silicon produced by reducing silicon dioxide with carbon, industrial grade silicon obtained by reducing impurities from metallurgical grade silicon by an acid treatment, unidirectional coagulation or the like, high-purity silicon with different crystalline states such as high-purity single crystal, polycrystalline, and amorphous states, produced from silane obtained by reacting silicon, and silicone obtained by making industrial grade silicon have a high purity by a sputtering method or an electron beam vapor deposition (EB vapor deposition) method, and adjusting the crystalline state or precipitation state at the same time.

In addition, examples thereof include silicon oxide, which is a compound of silicon and oxygen, and silicon compounds containing silicon and various alloys and of which the crystalline state is adjusted by a rapid cooling method or the like. Among these, a silicon-based negative electrode active material having a structure of which the outside is coated with a carbon film and in which silicon nanoparticles are dispersed in silicon oxide is preferable.

For the negative electrode active material of the present embodiment, in addition to the silicon-based negative electrode active material, it is preferable to use amorphous carbonaceous materials such as soft carbon or hard carbon, artificial graphite such as highly-graphitized carbon materials, or carbon powder such as natural graphite. Among these, it is preferable to use carbon powder such as artificial graphite and natural graphite.

The amount of the silicon-based negative electrode active material is preferably 3 to 50 mass % and more preferably 5 to 25 mass % when the amount of carbon powder such as artificial graphite or natural graphite is set as 100 mass %.

The BET specific surface area of the active material of the present embodiment is preferably 0.1 to 10 $m^2/g$, more preferably 0.2 to 5 $m^2/g$, and still more preferably 0.3 to 3 $m^2/g$.

The average particle size of the active material of the present embodiment is preferably in a range of 0.5 to 50 μm and more preferably 2 to 20 μm. The average particle size of the active material referred to in this specification is an average value of the particle sizes of the active material measured with an electron microscope.

(8) Method of Producing Mixture Slurry

The mixture slurry of the present embodiment can be produced by various conventionally known methods. For example, a production method of adding an active material to a carbon nanotube resin composition and a production method of adding an active material to a carbon nanotube dispersion and then adding a binder may be exemplified.

In order to obtain a mixture slurry of the present embodiment, it is preferable to add an active material to a carbon nanotube resin composition and then perform a treatment for dispersion. A dispersing device used for performing such a treatment is not particularly limited. For the mixture slurry, a mixture slurry can be obtained using the dispersing device described in the above carbon nanotube dispersion.

The amount of the active material in the mixture slurry of the present embodiment with respect to 100 parts by mass of the mixture slurry is preferably 20 to 85 parts by mass, more preferably 30 to 75 parts by mass, and still more preferably 40 to 70 parts by mass.

The amount of the carbon nanotubes in the mixture slurry of the present embodiment with respect to 100 parts by mass of the active material is preferably 0.01 to 10 parts by mass, more preferably 0.02 to 5 parts by mass, and still more preferably 0.03 to 1 part by mass.

The amount of the solid content in the mixture slurry of the present embodiment with respect to 100 mass % of the mixture slurry is preferably 30 to 90 mass %, more preferably 30 to 80 mass %, and still more preferably 40 to 75 mass %.

(9) Electrode Film

The electrode film of the present embodiment is formed by molding a mixture slurry. For example, it is a coating film in which an electrode mixture layer is formed by applying and drying a mixture slurry on a current collector.

The material and shape of the current collector used for the electrode film of the present embodiment are not particularly limited, and those suitable for various secondary batteries can be appropriately selected. For example, examples of materials of current collectors include metals such as aluminum, copper, nickel, titanium, and stainless steel, and alloys of these metals. In addition, regarding the shape, a foil on a flat plate is generally used, but a current collector with a roughened surface, a current collector having a perforated foil shape, and a current collector having a mesh shape can be used.

A method of applying a mixture slurry on the current collector is not particularly limited, and known methods can be used. Specific examples thereof include a die coating method, a dip coating method, a roll coating method, a doctor coating method, a knife coating method, a spray coating method, a gravure coating method, a screen printing method, and an electrostatic coating method. Regarding the drying method, standing drying, a fan dryer, a warm air dryer, an infrared heater, a far infrared heater and the like can be used, but the method is not particularly limited thereto.

In addition, after coating, rolling may be performed using a planographic press, a calendar roll or the like. The thickness of the electrode mixture layer is generally 1 μm or more and 500 μm or less, and preferably 10 μm or more and 300 μm or less.

(10) Nonaqueous Electrolyte Secondary Battery

The nonaqueous electrolyte secondary battery of the present embodiment includes a positive electrode, a negative electrode, and an electrolyte. At least one of the positive electrode and the negative electrode preferably includes the electrode film of the present embodiment.

Regarding the positive electrode, those obtained by applying and drying a mixture slurry containing a positive electrode active material on a current collector to produce an electrode film can be used.

Regarding the negative electrode, those obtained by applying and drying a mixture slurry containing a negative electrode active material on a current collector to produce an electrode film can be used.

Regarding the electrolyte, various conventionally known electrolytes in which ions can move can be used. Examples thereof include those containing lithium salts such as $LiBF_4$, $LiClO_4$, $LiPF_6$, $LiAsF_6$, $LiSbF_6$, $LiCF_3SO_3$, $Li(CF_3SO_2)_2N$, $LiC_4F_9SO_3$, $Li(CF_3SO_2)_3C$, LiI, LiBr, LiCl, LiAlCl, $LiHF_2$, LiSCN, and $LiBPh_4$ (where, Ph is a phenyl group), but the present invention is not limited thereto, and those containing sodium salts or calcium salts can be used. The electrolyte is preferably dissolved in a nonaqueous solvent and used as an electrolytic solution.

The nonaqueous solvent is not particularly limited, and examples thereof include carbonates such as ethylene carbonate, propylene carbonate, butylene carbonate, dimethyl carbonate, ethyl methyl carbonate, and diethyl carbonate; lactones such as γ-butyrolactone, γ-valerolactone, and γ-octanoic lactone; glymes such as tetrahydrofuran, 2-methyltetrahydrofuran, 1,3-dioxolane, 4-methyl-1,3-dioxolane, 1,2-methoxyethane, 1,2-ethoxyethane and 1,2-dibutoxyethane; esters such as methylformate, methylacetate, and methylpropionate; sulfoxides such as dimethyl sulfoxide and sulfolane; and nitriles such as acetonitrile. These solvents may be used alone or two or more thereof may be used in combination.

The nonaqueous electrolyte secondary battery of the present embodiment preferably contains a separator.

Examples of separators include a polyethylene non-woven fabric, a polypropylene non-woven fabric, a polyamide non-woven fabric and those obtained by subjecting them to a hydrophilic treatment, but the present invention is not particularly limited thereto.

The structure of the nonaqueous electrolyte secondary battery of the present embodiment is not particularly limited, but is generally composed of a positive electrode and a negative electrode, and a separator provided as necessary, and various shapes such as a paper shape, a cylindrical shape, a button shape, and a laminate shape can be used according to the purpose of use.

EXAMPLES

The present invention will be described below in more detail with reference to examples. The present invention is not limited to the following examples as long as other examples do not depart from the gist thereof. In examples, "carbon nanotube" may be abbreviated as "CNT." Here, unless otherwise specified, "parts" represents "parts by mass," and "%" represents "mass %."

<Method of Measuring Physical Properties>

Physical properties of CNTs used in examples and comparative examples to be described below were measured by the following methods.

<G/D Ratio of CNT>

CNTs were placed on a Raman microscope (XploRA, commercially available from HORIBA, Ltd.) and measurement was performed using a laser wavelength of 532 nm. The measurement conditions were a fetching time of 60 seconds, a number of times of integrations of 2, a neutral density filter of 10%, an objective lens magnification of 20, a confocal hole of 500, a slit width of 100 μm, and a measurement wavelength of 100 to 3,000 $cm^{-1}$. CNTs for measurement were dispensed on a slide glass, and flattened using a spatula. Among the obtained peaks, in the spectrum, the maximum peak intensity within a range of 1,560 to 1,600 $cm^{-1}$ was G, the maximum peak intensity within a range of 1,310 to 1,350 $cm^{-1}$ was D, and the ratio of G/D was used as the G/D ratio of CNTs.

<BET Specific Surface Area of CNTs>

0.03 g of CNTs was weighed out using an electronic balance (MSA225S100DI, commercially available from Sartorius), and then dried at 110° C. for 15 minutes while degassing. Then, the BET specific surface area of CNTs was measured using a fully automatic specific surface area measuring device (HM-model1208, commercially available from MOUNTECH).

<Average Outer Diameter of CNT>

0.2 g of CNTs was weighed out in a 450 mL SM sample bottle (commercially available from Sansyo Co., Ltd.) using an electronic balance (MSA225S100DI, commercially available from Sartorius), 200 mL of toluene was added thereto, and the mixture was dispersed using an ultrasonic homogenizer (Advanced Digital Sonifer (registered trademark), MODEL 450DA, commercially available from BRANSON) at an amplitude of 50% for 5 minutes under ice cooling to prepare a CNT dispersion. Then, the CNT dispersion was appropriately diluted, several μL thereof was added dropwise into a form of a collodion film and dried at room temperature, and observation was then performed using a direct transmission electron microscope (H-7650, commercially available from Hitachi, Ltd.). Observation was performed at a magnification of 50,000, a plurality of images including 10 or more CNTs within the field of view were captured, the outer diameters of 300 randomly extracted CNTs were measured, and the average value thereof was used as the average outer diameter (nm) of the CNTs.

<Volume Resistivity of CNT>

Using a powder resistivity measuring device (Loresta GP powder resistivity measurement system MCP-PD-51, commercially available from Mitsubishi Chemical Analytech Co., Ltd.), 1.2 g of a sample mass was used, and using a powder probe unit (four-point probe/ring electrode, electrode interval of 5.0 mm, electrode radius of 1.0 mm, sample radius of 12.5 mm), an applied voltage limiter was set to 90 V, and the volume resistivity [Ω·cm] of the conductive powder was measured under various pressures. The value of the volume resistivity of CNTs at a density of 1 $g/cm^3$ was evaluated.

<Particle Size Distribution of CNT Dispersion>

The CNT dispersion was left in a thermostatic chamber at 25° C. for 1 hour or longer, the CNT dispersion was then sufficiently stirred and diluted, and the cumulative particle sizes D10 and D50 of the CNT dispersion were measured using a particle size distribution meter (Nanotrac UPA, model UPA-EX, commercially available from MicrotracBel Corp.). The permeability was absorption, the CNT density was 1.8, and the shape was non-spherical. The refractive index of the solvent was 1.333. Measurement was performed by diluting the concentration of the CNT dispersion so that the numerical value of the loading index was in a range of 0.8 to 1.2.

<Complex Elastic Modulus and Phase Angle of CNT Dispersion>

The complex elastic modulus and phase angle of the CNT dispersion were evaluated by using a rheometer (RheoStress1 rotational rheometer, commercially available from Thermo Fisher Scientific) with a cone of a diameter of 35 mm and 2°, and measuring the dynamic viscoelasticity at 25° C. and a frequency of 1 Hz with a strain rate in the range of 0.01% to 5%.

<Viscosity of CNT Dispersion>

The CNT dispersion was left in a thermostatic chamber at 25° C. for 1 hour or longer, the CNT dispersion was then sufficiently stirred, and the viscosity was evaluated by measuring the shear viscosity at 25° C. and a shear rate of 1 $s^{-1}$ and 10 $s^{-1}$ using a rheometer (RheoStress1 rotational rheometer, commercially available from Thermo Fisher Scientific) with a cone of a diameter of 35 mm and 2°.

<Peeling Strength of Electrode Film for Negative Electrode>

A negative electrode mixture slurry was applied onto a copper foil using an applicator so that the basis weight per unit of the electrode was 8 $mg/cm^2$ and the coating film was then dried in an electric oven at 120° C.±5° C. for 25 minutes. Then, the film was cut into two 90 mm×20 mm rectangles with the coating direction as the major axis. The peeling strength was measured using a desktop tensile tester (Strograph E3, commercially available from Toyo Seiki Co., Ltd.) and evaluated according to the 180 degree peeling test method. Specifically, a double-sided tape with a size of 100 mm×30 mm (No. 5,000NS, commercially available from Nitoms Inc.) was attached to a stainless steel plate, the produced battery electrode mixture layer was brought into close contact with the other surface of the double-sided tape, peeling off was performed while pulling from the bottom to the top at a certain speed (50 mm/min), and the average value of stress at this time was used as the peeling strength.

<Peeling Strength of Electrode Film for Positive Electrode>

A positive electrode mixture slurry was applied onto an aluminum foil using an applicator so that the basis weight per unit of the electrode was 20 mg/cm$^2$ and the coating film was then dried in an electric oven at 120° C.±5° C. for 25 minutes. Then, the film was cut into two 90 mm×20 mm rectangles with the coating direction as the major axis. The peeling strength was measured using a desktop tensile tester (Strograph E3, commercially available from Toyo Seiki Co., Ltd.) and evaluated according to the 180 degree peeling test method. Specifically, a double-sided tape with a size of 100 mm×30 mm (No. 5,000NS, commercially available from Nitoms Inc.) was attached to a stainless steel plate, the produced battery electrode mixture layer was brought into close contact with the other surface of the double-sided tape, peeling off was performed while pulling from the bottom to the top at a certain speed (50 mm/min), and the average value of stress at this time was used as the peeling strength.

<Production of Standard Positive Electrode>

First, 93 parts by mass of the positive electrode active material (HED (registered trademark) NCM-111 1100, commercially available from BASF TODA Battery Materials LLC), 4 parts by mass of acetylene black (Denka Black (registered trademark) HS100, commercially available from Denka Co., Ltd.), and 3 parts by mass of PVDF (Kureha KF polymer W #1300, commercially available from Kureha Battery Materials Japan Co., Ltd.) were put into a plastic container having a volume of 150 cm$^3$ and then mixed with a spatula until powder was uniform. Then, 20.5 parts by mass of NMP was added thereto, and the mixture was stirred at 2,000 rpm for 30 seconds using a rotation/revolution mixer (Thinky Mixer, ARE-310, commercially available from Thinky Corporation). Then, the mixture in the plastic container was mixed with a spatula until it was uniform, and stirred at 2,000 rpm for 30 seconds using the rotation/revolution mixer. In addition, 14.6 parts by mass of NMP was then added thereto, and the mixture was stirred at 2,000 rpm for 30 seconds using the rotation/revolution mixer. Finally, the sample was stirred at 3,000 rpm for 10 minutes using a high-speed stirrer to obtain a positive electrode mixture slurry. Then, the positive electrode mixture slurry was applied onto an aluminum foil having a thickness of 20 μm as a current collector using an applicator and then dried in an electric oven at 120° C.±5° C. for 25 minutes, and the basis weight per unit area of the electrode was adjusted to 20 mg/cm$^2$. In addition, the sample was rolled by a roll press (3 t hydraulic roll press, commercially available from Thank-Metal Co., Ltd.) to produce a standard positive electrode having a mixture layer density of 3.1 g/cm$^3$.

<Production of Standard Negative Electrode>

0.5 parts by mass of acetylene black (Denka Black (registered trademark) HS-100, commercially available from Denka Co., Ltd.), 1 part by mass of MAC500LC (carboxymethyl cellulose sodium salt Sunrose special type MAC500LC, commercially available from Nippon Paper Industries Co., Ltd., non-volatile content of 100%), and 98.4 parts by mass of water were put into a plastic container having a volume of 150 ml, and then stirred using a rotation/revolution mixer (Thinky Mixer, ARE-310, commercially available from Thinky Corporation) at 2,000 rpm for 30 seconds. In addition, 87 parts by mass of artificial graphite (CGB-20, commercially available from Nippon Graphite Industries, Co., Ltd.) as an active material and 10 parts by mass of silicon were added, and the mixture was stirred using a high-speed stirrer at 3,000 rpm for 10 minutes. Subsequently, 3.1 parts by mass of SBR (TRD2001, commercially available from JSR) was added thereto, and the mixture was stirred at 2,000 rpm for 30 seconds using the rotation/revolution mixer to obtain a negative electrode mixture slurry. Then, the negative electrode mixture slurry was applied onto a copper foil using an applicator so that the basis weight per unit of the electrode was 8 mg/cm$^2$ and the coating film was then dried in an electric oven at 120° C.±5° C. for 25 minutes. In addition, the sample was rolled by a roll press (3t hydraulic roll press, commercially available from Thank-Metal Co., Ltd.) to produce a standard negative electrode having a mixture layer density of 1.7 g/cm$^3$.

<Evaluation of Rate Property of Lithium Ion Secondary Battery>

A laminate type lithium ion secondary battery was placed in a thermostatic chamber at 25° C., and charging and discharging measurement was performed using a charging and discharging device (SM-8, commercially available from Hokuto Denko Corporation). Constant current and constant voltage charging (a cutoff current of 1.1 mA (0.02C)) was performed at a charging current of 11 mA (0.2C) and a charge final voltage of 4.2 V, and constant current discharging was then performed at a discharging current of 11 mA (0.2C) and a discharge final voltage of 2.5 V. This operation was repeated three times and constant current and constant voltage charging (cutoff current of 1.1 mA (0.02C)) was then performed at a charging current of 11 mA (0.2C) and a charge final voltage of 4.2 V, and constant current discharging was performed at a discharging current of 0.2C and 3C until the discharge final voltage reached 2.5 V, and each discharging capacity was determined. The rate property can be expressed as a ratio between the 0.2C discharging capacity and the 3C discharging capacity according to the following Formula 1.

$$\text{Rate property}=3C\text{ discharging capacity}/3rd0.2C\text{ discharging capacity}\times 100(\%) \qquad \text{(Formula 1)}$$

<Evaluation of Cycle Property of Lithium Ion Secondary Battery>

The laminate type lithium ion secondary battery was placed in a thermostatic chamber at 25° C., and charging and discharging measurement was performed using a charging and discharging device (SM-8, commercially available from Hokuto Denko Corporation). Constant current and constant voltage charging (a cutoff current of 1.38 mA (0.025C)) was performed at a charging current of 55 mA (1C) and a charge final voltage of 4.2 V and constant current discharging was then performed at a discharging current of 55 mA (1C) and a discharge final voltage of 2.5 V. This operation was repeated 200 times. 1C was the current value at which the theoretical capacity of the positive electrode was discharged in 1 hour. The cycle property can be expressed as a ratio between the 3rd 1C discharging capacity and the 200th 1C discharging capacity at 25° C. according to the following Formula 2.

$$\text{Cycle property}=200th1C\text{ discharging capacity}/3rd1C\text{ discharging capacity}\times 100(\%) \qquad \text{(Formula 2)}$$

<Synthesis of Dispersing Agent (A)>

100 parts of acetonitrile was put into a reaction container including a gas inlet pipe, a thermometer, a condenser, and a stirrer, and the inside was purged with nitrogen gas. The inside of the reaction container was heated to 70° C., and a mixture containing 85.0 parts of acrylonitrile, 15.0 parts of acrylic acid, and 5.0 parts of 2,2'-azobis(2,4-dimethylvaleronitrile) (V-65, commercially available from NOF Corporation) was added dropwise over 2 hours and a polymerization reaction was performed. After dropwise addition was completed, the reaction was additionally performed at 70° C. for 1 hour, 0.5 parts of perbutyl O was then added, and the reaction was additionally continued at 70° C. for 1 hour.

Then, the non-volatile content was measured, and it was confirmed that the conversion ratio exceeded 98%, and the dispersion medium was completely removed by concentration under a reduced pressure to obtain a dispersing agent (A). The weight average molecular weight (Mw) of the dispersing agent (A) was 38,000.

(Method of Measuring Weight Average Molecular Weight (Mw))

The weight average molecular weight (Mw) of the produced dispersing agent (A) was measured through gel permeation chromatography (GPC) with an RI detector under the following conditions. The molecular weight was a pullulan conversion value.

Measurement sample: 0.1 mass % aqueous solution

Device: HLC-8320GPC (commercially available from Tosoh Corporation)

Eluent: 0.1M NaCl aqueous solution

Column: TSKgel Super Multipore PW-M (commercially available from Tosoh Corporation)

Flow rate: 1.0 mL/min

Temperature: 25° C.

Injection volume: 100 μl (Method of Measuring Degree of Etherification)

2.0 g of carboxymethyl cellulose sodium salt and 100 mL of methanol nitrate were put into a 300 mL stoppered Erlenmeyer flask and shaken for 2 hours to replace sodium carboxymethylcellulose with carboxymethyl cellulose. Then, carboxymethyl cellulose was subjected to suction filtration using a glass filter and washed with 200 mL of 80% methanol. Then, it was replaced with 50 mL of anhydrous methanol and subjected to suction filtration and then dried at 105° C. for 2 hours. 1.0 to 1.5 g of dried carboxymethyl cellulose was weighed out, put into a 300 mL stoppered Erlenmeyer flask, and moistened with 15 mL of 80% methanol, 50 mL of 1/10 N sodium hydroxide was added thereto and the mixture was shaken for 2 hours. Then, using phenolphthalein as an indicator, excess sodium hydroxide was back-titrated with 1/10 N sulfuric acid, and the degree of etherification was calculated according to (Formula 3) and (Formula 4).

$$A=(50\times F1-X\times F2)/(Y\times 10) \quad \text{(Formula 3)}$$

X: amount of sulfuric acid added dropwise, Y: weight of dry carboxymethyl cellulose F1: factor of sulfuric acid, F2: factor of sodium hydroxide $$\text{Degree of etherification}=0.162A/(1-0.058A) \quad \text{(Formula 4)}$$

Table 1 shows CNTs used in examples and comparative examples, the outer diameter of the CNTs, the specific surface area of the CNTs, the G/D ratio, and the volume resistivity. FIGURE shows Raman spectrums of CNTs used in examples and comparative examples.

TABLE 1

| CNT | Type of CNT | Outer diameter (nm) | BET specific surface area ($m^2/g$) | G/D ratio | Powder resistivity (Ω · cm) |
|---|---|---|---|---|---|
| A | TNSR (Timesnano) | 1 to 2 | 610 | 27.8 | $1.9\times10^{-3}$ |
| B | TNSAR (Timesnano) | 1 to 2 | 950 | 36.4 | $2.5\times10^{-3}$ |
| C | TUBALL SWCNT 93% (OCSiA) | 1.2 to 2.0 | 980 | 41.7 | $3.0\times10^{-3}$ |

TABLE 1-continued

| CNT | Type of CNT | Outer diameter (nm) | BET specific surface area ($m^2/g$) | G/D ratio | Powder resistivity (Ω · cm) |
|---|---|---|---|---|---|
| D | SG101 (Zeon Corporation) | 3 to 5 | 1,180 | 5.1 | $2.5\times10^{-2}$ |
| E | JENOTUBE 8S (JEIO) | 6 to 9 | 750 | 0.78 | $1.5\times10^{-2}$ |
| F | NC7000 (Nanocy1) | 10 | 210 | 0.98 | $1.7\times10^{-2}$ |
| G | TUBALL SWCNT 80% (OCSiA) | 1.3 to 2.3 | 520 | 39.1 | $2.4\times10^{-3}$ |

Table 2 shows dispersing agents used in examples, comparative examples and reference examples.

TABLE 2

| Dispersing agent | Type of dispersing agent | Average molecular weight | Degree of etherification |
|---|---|---|---|
| A | copolymer of acrylonitrile and acrylic acid | 38,000 | |
| B | carboxymethyl cellulose sodium salt (Sunrose ® F01MC, Nippon Paper Industries) | 55,600 | 0.65 to 0.75 |
| C | carboxymethyl cellulose sodium salt (Sunrose ® APP-84, Nippon Paper Industries | 17,600 | 0.65 to 0.75 |
| D | polyvinylpyrrolidone (K-30, Nippon Shokubai Co., Ltd.) | 40,000 | |
| E | H-NBR (hydrogenated acrylonitrile-butadiene rubber) (Zetpole ® 3300, Zeon Corporation) | | |
| F | carboxymethyl cellulose sodium salt (Blanose ™ 7UL, Ashland) | | 0.60 to 0.90 |

Example 1

98.25 parts of deionized water was put into a stainless steel container, 0.75 parts of the dispersing agent (A) was added while stirring was performed with a disper, and the mixture was stirred with a disper until it was uniform. Then, 1 part of the CNT (A) was weighed out and added while stirring was performed with a disper, a square hole high shear screen was installed in a high shear mixer (L5M-A, commercially available from SILVERSON), and batch type dispersion was performed at a rate of 8,600 rpm until the entire sample was made uniform. Subsequently, a liquid to be dispersed was supplied from the stainless steel container to a high pressure homogenizer (Star Burst Labo HJP-17007, commercially available from Sugino Machine Ltd.) through a pipe and a pass-type dispersion treatment was performed 5 times to obtain a CNT dispersion (WA1). The dispersion treatment was performed using a single nozzle chamber with a nozzle diameter of 0.25 mm and a pressure of 100 MPa.

(Examples 2 to 15), (Examples 19 to 20), (Comparative Examples 1 and 2)

CNT dispersions (WA2 to WF4) were obtained in the same method as in Example 1 except that the type of CNT, the amount of CNT added, the type of dispersing agent, the amount of dispersing agent added, the amount of deionized water added, and the number of passes were changed as listed in Table 3.

Example 16

4 parts by mass of the CNT dispersion (WA1) produced in Example 1 and 6 parts by mass of deionized water were weighed out in a plastic container having a volume of 150 $cm^3$. Then, the sample was stirred using a rotation/revolution mixer (Thinky Mixer, ARE-310, commercially available from Thinky Corporation) at 2,000 rpm for 30 seconds to obtain a CNT dispersion (WA13).

Example 17

A CNT dispersion (WA14) was obtained in the same method as in Example 16 except that the CNT dispersion (WA3) produced in Example 3 was used.

Example 18

A CNT dispersion (WA15) was obtained in the same method as in Example 16 except that the CNT dispersion (WA11) produced in Example 11 was used.

Example 21

20 parts of the CNT (C), and 480 parts of zirconia beads with a diameter of 8 mm as pulverization media were put into a polypropylene bottle container, and a pulverization treatment was performed with a paint conditioner (commercially available from Red Devil) for 40 minutes. Then, the zirconia beads were separated to collect the CNT (C). Next, 98.38 parts of deionized water was added to a stainless steel container, and 1.13 parts of the dispersing agent (C) was added while stirring was performed with a disper, and the sample was stirred using a disper until it was uniform. Then, 1.5 parts of the collected CNT (C) was weighed out and added while stirring was performed with a disper, a square hole high shear screen was installed in a high shear mixer (L5M-A, commercially available from SILVERSON), and batch type dispersion was performed at a rate of 8,600 rpm until the entire sample was made uniform. Subsequently, a liquid to be dispersed was supplied from the stainless steel container to a high pressure homogenizer (Star Burst Labo HJP-17007, commercially available from Sugino Machine Ltd.) through a pipe, and a pass-type dispersion treatment was performed 20 times to obtain a CNT dispersion (WC27). The dispersion treatment was performed using a single nozzle chamber with a nozzle diameter of 0.25 mm and a pressure of 100 MPa.

Example 22

98.40 parts of deionized water was put into a stainless steel container, 0.50 parts of the dispersing agent (C) and 0.10 parts of polyacrylic acid (commercially available from FUJIFILM Wako Pure Chemical Corporation, a molecular weight of 25,000) were added while stirring was performed with a disper, and the sample was stirred using a disper until it was uniform. Then, 1.0 part of the CNT (A) was weighed out and added while stirring was performed with a disper, a square hole high shear screen was installed in a high shear mixer (L5M-A, commercially available from SILVERSON), and batch type dispersion was performed at a rate of 8,600 rpm until the entire sample was made uniform. Subsequently, a liquid to be dispersed was supplied from the stainless steel container to a high pressure homogenizer (Star Burst Labo HJP-17007, commercially available from Sugino Machine Ltd.) through a pipe, and a pass-type dispersion treatment was performed 20 times to obtain a CNT dispersion (WA28). The dispersion treatment was performed using a single nozzle chamber with a nozzle diameter of 0.25 mm and a pressure of 100 MPa.

Comparative Example 3

1 part of the CNT (A), 0.75 parts of the dispersing agent (A), 98.25 parts of deionized water and 120 parts of zirconia beads (a bead diameter of 1.25 mmφ) were put into a glass bottle (M-140, commercially available from Hakuyo Glass Co., Ltd.), a dispersion treatment was performed using a paint conditioner (commercially available from Red Devil) for 8 hours, and separation of the zirconia beads was then attempted, but the viscosity was high, and the CNT dispersion could not be obtained.

Comparative Examples 4 to 6

A dispersion treatment was performed in the same method as in Comparative Example 3 except that the amount of CNT added, the dispersion time, and the bead diameter were changed as listed in Table 3, the zirconia beads were then separated to obtain CNT dispersions (WA17 to WA19).

TABLE 3

| | CNT dispersion | CNT | | Dispersing agent | | Deionized water | | | | |
|---|---|---|---|---|---|---|---|---|---|---|
| | | Type | Amount of CNT added (parts) | Type | Amount added (parts) | Amount added (parts) | CNT concentration | Amount of dispersing agent (vs. CNT concentration) | Number of passes | Dispersion pressure (MPa) |
| Example 1 | WA1 | CNT(A) | 1 | A | 0.75 | 98.25 | 1.0% | 75% | 5 | 100 |
| Example 2 | WA2 | CNT(A) | 1 | A | 0.75 | 98.25 | 1.0% | 75% | 10 | 100 |
| Example 3 | WA3 | CNT(A) | 1 | A | 0.75 | 98.25 | 1.0% | 75% | 15 | 100 |

TABLE 3-continued

| | | | | | | | | | | |
|---|---|---|---|---|---|---|---|---|---|---|
| Example 4 | WA4 | CNT(A) | 1 | A | 0.75 | 98.25 | 1.0% | 75% | 20 | 100 |
| Example 5 | WA5 | CNT(A) | 1 | A | 1.5 | 97.5 | 1.0% | 150% | 20 | 100 |
| Example 6 | WA6 | CNT(A) | 1 | A | 2.25 | 96.75 | 1.0% | 225% | 20 | 100 |
| Example 7 | WA7 | CNT(A) | 1 | B | 0.75 | 98.25 | 1.0% | 75% | 20 | 100 |
| Example 8 | WA8 | CNT(A) | 1 | C | 0.75 | 98.25 | 1.0% | 75% | 20 | 100 |
| Example 9 | WA9 | CNT(A) | 1 | D | 0.75 | 98.25 | 1.0% | 75% | 20 | 100 |
| Example 10 | WA10 | CNT(A) | 1 | A | 0.75 | 98.25 | 1.0% | 75% | 25 | 100 |
| Example 11 | WA11 | CNT(A) | 1 | A | 0.75 | 98.25 | 1.0% | 75% | 30 | 100 |
| Example 12 | WA12 | CNT(A) | 0.4 | A | 0.3 | 99.3 | 0.4% | 75% | 5 | 100 |
| Example 13 | WB4 | CNT(B) | 1 | A | 0.75 | 98.25 | 1.0% | 75% | 20 | 100 |
| Example 14 | WC4 | CNT(C) | 1 | A | 0.75 | 98.25 | 1.0% | 75% | 20 | 100 |
| Example 15 | WD4 | CNT(D) | 0.4 | A | 0.3 | 99.3 | 0.4% | 75% | 20 | 100 |
| Example 16 | WA13 | CNT(A) | 0.4 | A | 0.3 | 99.3 | 0.4% | 75% | 5 | 100 |
| Example 17 | WA14 | CNT(A) | 0.4 | A | 0.3 | 99.3 | 0.4% | 75% | 15 | 100 |
| Example 18 | WA15 | CNT(A) | 0.4 | A | 0.3 | 99.3 | 0.4% | 75% | 30 | 100 |
| Example 19 | WA25 | CNT(A) | 1 | C | 1.5 | 97.5 | 1.0% | 150% | 20 | 100 |
| Example 20 | WA26 | CNT(A) | 1 | F | 0.75 | 98.25 | 1.0% | 75% | 20 | 100 |
| Example 21 | WC27 | CNT(C) | 1.5 | C | 1.13 | 97.38 | 1.5% | 75% | 20 | 100 |
| Comparative Example 1 | WE4 | CNT(E) | 1 | A | 0.75 | 98.25 | 1.0% | 75% | 20 | 100 |
| Comparative Example 2 | WF4 | CNT(F) | 1 | A | 0.75 | 98.25 | 1.0% | 75% | 20 | 100 |

| | | CNT | | Dispersing agent | | Polyacrylic acid | Deionized water | | Amount of dispersing agent (vs. | | |
|---|---|---|---|---|---|---|---|---|---|---|---|
| | CNT dispersion | Type | Amount of CNT added (parts) | Type | Amount added (parts) | Amount added (parts) | Amount added (parts) | CNT concentration | CNT concentration) | Number of passes | Dispersion pressure (MPa) |
| Example 22 | WA28 | CNT(A) | 1 | C | 0.5 | 0.10 | 98.40 | 1.0% | 50% | 20 | 100 |

| | | CNT | | Dispersing agent | | Deionized water | | Amount of dispersing agent (vs. | | |
|---|---|---|---|---|---|---|---|---|---|---|
| | CNT dispersion | Type | Amount of CNT added (parts) | Type | Amount added (parts) | Amount added (parts) | CNT concentration | CNT concentration) | Dispersion time | Bead diameter (mmφ) |
| Comparative Example 4 | WA17 | CNT(G) | 0.4 | D | 0.3 | 99.3 | 0.4% | 75% | 4 | 0.5 |
| Comparative Example 5 | WA18 | CNT(G) | 0.4 | D | 0.3 | 99.3 | 0.4% | 75% | 8 | 0.5 |
| Comparative Example 6 | WA19 | CNT(G) | 0.4 | D | 0.3 | 99.3 | 0.4% | 75% | 8 | 1.25 |

Example 23

99.3 parts of NMP was put into a stainless steel container, 0.3 parts of the dispersing agent (E) was added while stirring was performed with a disper, and the mixture was stirred with a disper until the dispersing agent (E) was dissolved. Then, 0.4 parts of the CNT (A) was weighed out and added while stirring was performed with a disper, a square hole high shear screen was installed in a high shear mixer (L5M-A, commercially available from SILVERSON), and batch type dispersion was performed at a rate of 8,600 rpm until the entire sample was made uniform. Subsequently, a liquid to be dispersed was supplied from the stainless steel container to a high pressure homogenizer (Star Burst Labo HJP-17007, commercially available from Sugino Machine Ltd.) through a pipe, and a pass-type dispersion treatment was performed 20 times to obtain a CNT dispersion (A20). The dispersion treatment was performed using a single nozzle chamber with a nozzle diameter of 0.25 mm and a pressure of 100 MPa.

Examples 24 to 26

CNT dispersions (A21 to A23) were obtained in the same method as in Example 23 except that the number of passes was changed as shown in Table 4.

Comparative Example 7

0.4 parts of the CNT (A), 0.3 parts of the dispersing agent (E), 99.3 parts of NMP and 120 parts of zirconia beads (a bead diameter of 1.25 mmφ) were put into a glass bottle (M-140, commercially available from Hakuyo Glass Co., Ltd.), a dispersion treatment was performed using a paint conditioner (commercially available from Red Devil) for 8 hours, and the zirconia beads were then separated to obtain a CNT dispersion (A24).

TABLE 4

| | CNT dispersion | CNT Type | CNT Amount of CNT added (parts) | Dispersing agent Type | Dispersing agent Amount added (parts) | NMP Amount added (parts) | CNT concentration | Amount of dispersing agent (vs. CNT concentration) | Number of passes | Dispersion pressure (MPa) |
|---|---|---|---|---|---|---|---|---|---|---|
| Example 23 | A20 | CNT(A) | 0.4 | E | 0.3 | 99.3 | 0.4% | 75% | 20 | 100 |
| Example 24 | A21 | CNT(A) | 0.4 | E | 0.3 | 99.3 | 0.4% | 75% | 25 | 100 |
| Example 25 | A22 | CNT(A) | 0.4 | E | 0.3 | 99.3 | 0.4% | 75% | 30 | 100 |
| Example 26 | A23 | CNT(A) | 0.4 | E | 0.3 | 99.3 | 0.4% | 75% | 35 | 100 |

| | CNT dispersion | CNT Type | CNT Amount of CNT added (parts) | Dispersing agent Type | Dispersing agent Amount added (parts) | NMP Amount added (parts) | CNT concentration | Amount of dispersing agent (vs. CNT concentration) | Dispersion time (h) | Bead diameter (mmϕ) |
|---|---|---|---|---|---|---|---|---|---|---|
| Comparative Example 7 | A24 | CNT(G) | 0.4 | E | 0.3 | 99.3 | 0.4% | 75% | 8 | 0.5 |

Table 5 shows the evaluation results of the CNT dispersions produced in Examples 1 to 26 and Comparative Examples 1 to 7. The phase angle of the CNT dispersion at 25° C. and a frequency of 1 Hz was evaluated as O (good) when it was 10 or more and less than 50, Δ (acceptable) when it was 5 or more and less than 10, and x (poor) when it was less than 5 or 50 or more. The complex elastic modulus of the CNT dispersion at 25° C. and a frequency of 1 Hz was evaluated as O (good) when it was 5 or more and less than 400, Δ (acceptable) when it was 400 or more and less than 650, and x (poor) when it was less than 5. The viscosity of the CNT dispersion was evaluated as ◎ (very good) when the shear viscosity at a shear rate of 1 was 20 or more and less than 40, O (good) when the shear viscosity was 10 or more and less than 20 or 40 or more and less than 60, Δ (acceptable) when the shear viscosity was 5 or more and less than 10, and x (poor) when the shear viscosity was less than 5. The particle size of the CNT dispersion was evaluated as ◎ (very good) when the particle size distribution in the particle size distribution D10 was 200 or more and less than 300, O (good) when the particle size distribution was 300 or more and less than 500, and x (poor) when the particle size distribution was less than 200.

TABLE 5

| | CNT dispersion | CNT concentration | Amount of dispersing agent (vs. CNT concentration) | Phase angle (°) | Complex elastic modulus (Pa) | Shear viscosity at shear rate of 1 (Pa · s) | Shear viscosity at shear rate of 10 (Pa · s) | Particle size distribution D10 (nm) | Particle size distribution D50 (nm) | Phase angle evaluation | Complex elastic modulus evaluation | Viscosity evaluation | Particle size evaluation |
|---|---|---|---|---|---|---|---|---|---|---|---|---|---|
| Example 1 | WA1 | 1.0% | 75% | 7.5 | 648.3 | 38.4 | 6.9 | 360 | 987 | Δ | Δ | ◎ | ○ |
| Example 2 | WA2 | 1.0% | 75% | 8.5 | 393.2 | 26.7 | 5.3 | 282 | 1066 | Δ | ○ | ◎ | ◎ |
| Example 3 | WA3 | 1.0% | 75% | 7.7 | 338.4 | 25.5 | 4.8 | 270 | 1057 | Δ | ○ | ◎ | ◎ |
| Example 4 | WA4 | 1.0% | 75% | 8.9 | 248.6 | 23.4 | 4.4 | 262 | 1043 | Δ | ○ | ◎ | ◎ |
| Example 5 | WA5 | 1.0% | 150% | 9.5 | 285.9 | 35.1 | 5.7 | 247 | 621 | ○ | ○ | ◎ | ◎ |
| Example 6 | WA6 | 1.0% | 225% | 10.1 | 371.7 | 59.7 | 8.6 | 220 | 504 | ○ | ○ | ○ | ◎ |
| Example 7 | WA7 | 1.0% | 75% | 10.5 | 397.8 | 37.4 | 7.0 | 231 | 1269 | ○ | ○ | ◎ | ◎ |
| Example 8 | WA8 | 1.0% | 75% | 11.8 | 252.0 | 24.8 | 4.2 | 245 | 826 | ○ | ○ | ◎ | ◎ |
| Example 9 | WA9 | 1.0% | 75% | 8.1 | 447.5 | 42.1 | 7.9 | 345 | 2366 | Δ | Δ | ○ | ○ |
| Example 10 | WA10 | 1.0% | 75% | 9.7 | 240.4 | 21.6 | 4.0 | 256 | 1021 | ○ | ○ | ◎ | ◎ |
| Example 11 | WA11 | 1.0% | 75% | 10.1 | 230.0 | 15.2 | 3.3 | 242 | 987 | ○ | ○ | ○ | ◎ |
| Example 12 | WA12 | 0.4% | 75% | 7.1 | 102.3 | 6.7 | 1.6 | 368 | 2953 | Δ | ○ | Δ | ○ |
| Example 13 | WB4 | 1.0% | 75% | 8.5 | 255.8 | 24.6 | 4.8 | 272 | 1061 | Δ | ○ | ◎ | ◎ |
| Example 14 | WC4 | 1.0% | 75% | 8.5 | 255.8 | 24.6 | 4.8 | 310 | 1611 | Δ | ○ | ◎ | ○ |
| Example 15 | WD4 | 0.4% | 75% | 4.8 | 410.5 | 28.8 | 5.1 | 331 | 2320 | Δ | Δ | ◎ | ○ |
| Example 16 | WA13 | 0.4% | 75% | 9.0 | 32.2 | 35.5 | 5.7 | 351 | 977 | Δ | ○ | ◎ | ○ |
| Example 17 | WA14 | 0.4% | 75% | 12.7 | 14.5 | 16.6 | 2.8 | 265 | 1031 | ○ | ○ | ○ | ◎ |
| Example 18 | WA15 | 0.4% | 75% | 17.6 | 7.0 | 14.5 | 2.2 | 240 | 972 | ○ | ○ | ○ | ◎ |
| Example 19 | WA25 | 1.0% | 150% | 8.8 | 330.9 | 38.2 | 6.9 | 270 | 992 | ○ | ○ | ◎ | ◎ |
| Example 20 | WA26 | 1.0% | 75% | 11.0 | 132.6 | 14.6 | 1.8 | 400 | 2380 | ○ | ○ | ○ | ○ |
| Example 21 | WC27 | 1.5% | 75% | 23.2 | 6.7 | 10.1 | 1.5 | 212 | 790 | ○ | ○ | ○ | ◎ |
| Example 22 | WA28 | 1.0% | 50% | 13.7 | 112.2 | 15.4 | 1.9 | 243 | 822 | ○ | ○ | ○ | ◎ |

TABLE 5-continued

| | CNT dispersion | CNT concentration | Amount of dispersing agent (vs. CNT concentration) | Phase angle (°) | Complex elastic modulus (Pa) | Shear viscosity at shear rate of 1 (Pa · s) | Shear viscosity at shear rate of 10 (Pa · s) | Particle size distribution D10 (nm) | Particle size distribution D50 (nm) | Phase angle evaluation | Complex elastic modulus evaluation | Viscosity evaluation | Particle size evaluation |
|---|---|---|---|---|---|---|---|---|---|---|---|---|---|
| Comparative Example 1 | WE4 | 1.0% | 75% | 12.4 | 26.5 | 7.1 | 1.4 | 179 | 491 | ○ | ○ | Δ | X |
| Comparative Example 2 | WF4 | 1.0% | 75% | 57 | 3.4 | 0.37 | 0.06 | 171 | 380 | X | X | X | X |
| Comparative Example 4 | WA17 | 0.4% | 75% | 8.9 | 27.1 | 4.4 | 0.94 | 194 | 881 | Δ | ○ | X | X |
| Comparative Example 5 | WA18 | 0.4% | 75% | 9.7 | 21.3 | 4.4 | 0.85 | 150 | 480 | ○ | ○ | X | X |
| Comparative Example 6 | WA19 | 0.4% | 75% | 10.6 | 20.1 | 4.3 | 0.86 | 151 | 930 | ○ | ○ | X | X |
| Example 23 | A20 | 0.4% | 75% | 8.3 | 188.8 | 22.5 | 4.1 | 469 | 1560 | Δ | ○ | ◎ | ○ |
| Example 24 | A21 | 0.4% | 75% | 6.9 | 132.9 | 20.8 | 3.7 | 403 | 1410 | Δ | ○ | ◎ | ○ |
| Example 25 | A22 | 0.4% | 75% | 6.9 | 125.5 | 18.7 | 3.6 | 308 | 1450 | Δ | ○ | ○ | ○ |
| Example 26 | A23 | 0.4% | 75% | 9.6 | 93.8 | 15.9 | 3.3 | 264 | 1382 | ○ | ○ | ○ | ◎ |
| Comparative Example 7 | A24 | 0.4% | 75% | 9.6 | 46.95 | 6.5 | 1.4 | 181 | 2450 | ○ | ○ | Δ | X |

Example 28

0.63 parts by mass of the CNT dispersion (WA1), 12.5 parts by mass of an aqueous solution in which 2 mass % of CMC (#1190, commercially available from Daicel FineChem Co., Ltd.) was dissolved, and 13.8 parts by mass of deionized water were weighed out in a plastic container having a volume of 150 $cm^3$. Then, the sample was stirred using a rotation/revolution mixer (Thinky Mixer, ARE-310, commercially available from Thinky Corporation) at 2,000 rpm for 30 seconds to obtain a CNT resin composition (WA1). Then, 2.92 parts by mass of silicon monoxide (SILICON MONOOXIDE, SiO 1.3C 5 μm, commercially available from Osaka Titanium Technologies Co., Ltd.,) was added thereto, and the mixture was stirred at 2,000 rpm for 30 seconds using the rotation/revolution mixer. In addition, 21.44 parts by mass of artificial graphite (CGB-20, commercially available from Nippon Graphite Industries, Co., Ltd.) was added, and the mixture was stirred at 2,000 rpm for 30 seconds using the rotation/revolution mixer. In addition, 0.78 parts by mass of a styrene butadiene rubber (TRD2001, commercially available from JSR Corporation) was then added, and the mixture was stirred at 2,000 rpm for 30 seconds using the rotation/revolution mixer to obtain a negative electrode mixture slurry (WA1).

(Examples 29 to 49), (Comparative Examples 8 to 12)

CNT resin compositions (WA2 to WA19) and negative electrode mixture slurries (WA2 to WA19) were obtained in the same method as in Example 28 except that the CNT dispersion was changed as listed in Table 6, and the amounts of the CNT dispersion and deionized water added were adjusted so that the amount of the CNT in 100 parts by mass of the mixture slurry was 0.025 parts by mass. The non-volatile content of the negative electrode mixture slurry was set as 48 mass %.

Example 50

7.0 parts by mass of NMP in which 8 mass % of PVDF (Solef #5130, commercially available from Solvay) was dissolved was weighed out in a plastic container having a volume of 150 $cm^3$. Then, 0.19 parts by mass of the CNT dispersion (A20) was added, and the mixture was stirred at 2,000 rpm for 30 seconds using the rotation/revolution mixer (Thinky Mixer, ARE-310) to obtain a CNT resin composition (A20). In addition, 36.9 parts of the positive electrode active material (HED (registered trademark) NCM-111 1100, commercially available from BASF TODA Battery Materials LLC) was then added, and the mixture was stirred at 2,000 rpm for 2.5 minutes using the rotation/revolution mixer to obtain a positive electrode mixture slurry (A20).

(Examples 51 to 53), (Comparative Example 13)

CNT resin compositions (A21 to A24) and positive electrode mixture slurries (A21 to A24) were obtained in the same method as in Example 50 except that the CNT dispersion was changed as listed in Table 6.

TABLE 6

| | Negative electrode mixture slurry | CNT resin composition | CNT dispersion |
|---|---|---|---|
| Example 28 | WA1 | WA1 | WA1 |
| Example 29 | WA2 | WA2 | WA2 |
| Example 30 | WA3 | WA3 | WA3 |
| Example 31 | WA4 | WA4 | WA4 |
| Example 32 | WA5 | WA5 | WA5 |
| Example 33 | WA6 | WA6 | WA6 |
| Example 34 | WA7 | WA7 | WA7 |
| Example 35 | WA8 | WA8 | WA8 |
| Example 36 | WA9 | WA9 | WA9 |
| Example 37 | WA10 | WA10 | WA10 |
| Example 38 | WA11 | WA11 | WA11 |
| Example 39 | WA12 | WA12 | WA12 |
| Example 40 | WB4 | WB4 | WB4 |
| Example 41 | WC4 | WC4 | WC4 |
| Example 42 | WD4 | WD4 | WD4 |
| Example 43 | WA13 | WA13 | WA13 |
| Example 44 | WA14 | WA14 | WA14 |
| Example 45 | WA15 | WA15 | WA15 |
| Example 46 | WA25 | WA25 | WA25 |
| Example 47 | WA26 | WA26 | WA26 |
| Example 48 | WA27 | WA27 | WC27 |
| Example 49 | WA28 | WA28 | WA28 |
| Comparative | WE4 | WE4 | WE4 |

TABLE 6-continued

| | | | |
|---|---|---|---|
| Example 8 | | | |
| Comparative Example 9 | WF4 | WF4 | WF4 |
| Comparative Example 10 | WA17 | WA17 | WA17 |
| Comparative Example 11 | WA18 | WA18 | WA18 |
| Comparative Example 12 | WA19 | WA19 | WA19 |
| | Positive electrode mixture slurry | CNT resin composition | CNT dispersion |
| Example 50 | A20 | A20 | A20 |
| Example 51 | A21 | A21 | A21 |
| Example 52 | A22 | A22 | A22 |
| Example 53 | A23 | A22 | A22 |
| Comparative Example 13 | A24 | A24 | A24 |

Example 54

The negative electrode mixture slurry (WA1) was applied onto a copper foil using an applicator so that the basis weight per unit of the electrode was 8 mg/cm$^2$ and the coating film was then dried in an electric oven at 120° C.±5° C. for 25 minutes to obtain an electrode film (WA1).

(Examples 55 to 75), (Comparative Examples 14 to 18)

Electrode films (WA2) to (WA19) were obtained in the same method as in Example 54 except that the negative electrode mixture slurry was changed as listed in Table 7.

Example 76

The positive electrode mixture slurry (A20) was applied onto a copper foil using an applicator so that the basis weight per unit of the electrode was 20 mg/cm$^2$ and the coating film was then dried in an electric oven at 120° C.±5° C. for 25 minutes to obtain an electrode film (A20).

(Examples 77 to 79), (Comparative Example 19)

Electrode films (A21) to (A24) were obtained in the same method as in Example 76 except that the positive electrode mixture slurry was changed as listed in Table 7.

Table 7 shows the evaluation results of the electrode films produced in Examples 54 to 79 and Comparative Examples 14 to 19. The adhesion was evaluated as ◎ (very good) when the peeling strength (Ω·cm) was 0.5 or more, O (good) when the peeling strength (Ω·cm) was 0.3 or more and less than 0.5, Δ (acceptable) when the peeling strength (Ω·cm) was 0.1 or more and less than 0.3, and x (poor) when the peeling strength (Ω·cm) was less than 0.1.

TABLE 7

| | Electrode film | Adhesion evaluation |
|---|---|---|
| Example 54 | WA1 | ○ |
| Example 55 | WA2 | ◎ |
| Example 56 | WA3 | ◎ |
| Example 57 | WA4 | ◎ |
| Example 58 | WA5 | ○ |
| Example 59 | WA6 | Δ |
| Example 60 | WA7 | ◎ |
| Example 61 | WA8 | ◎ |
| Example 62 | WA9 | ○ |
| Example 63 | WA10 | ◎ |
| Example 64 | WA11 | ◎ |
| Example 65 | WA12 | ○ |
| Example 66 | WB4 | ◎ |
| Example 67 | WC4 | ○ |
| Example 68 | WD4 | ○ |
| Example 69 | WA13 | ◎ |
| Example 70 | WA14 | ◎ |
| Example 71 | WA15 | ◎ |
| Example 72 | WA25 | ◎ |
| Example 73 | WA26 | ◎ |
| Example 74 | WC27 | ○ |
| Example 75 | WA28 | ○ |
| Comparative Example 14 | WE4 | Δ |
| Comparative Example 15 | WF4 | Δ |
| Comparative Example 16 | WA17 | ○ |
| Comparative Example 17 | WA18 | Δ |
| Comparative Example 18 | WA19 | Δ |
| Example 76 | A20 | ◎ |
| Example 77 | A21 | ◎ |
| Example 78 | A22 | ○ |
| Example 79 | A23 | ○ |
| Comparative Example 19 | A24 | Δ |

(Examples 80 to 101), (Comparative Examples 20 to 24)

The electrode films (WA1 to WA19) were rolled by a roll press (3 t hydraulic roll press, commercially available from Thank-Metal Co., Ltd.) to produce negative electrodes having a mixture layer density of 1.7 g/cm$^3$.

(Examples 102 to 105), (Comparative Example 25)

The electrode films (A20 to A24) were rolled by a roll press (3 t hydraulic roll press, commercially available from Thank-Metal Co., Ltd.) to produce positive electrodes having a mixture layer density of 3.2 g/cm$^3$.

Table 8 shows the negative electrodes and positive electrodes produced in Examples 80 to 105 and Comparative Examples 20 to 25.

TABLE 8

| | Negative electrode | Negative electrode density (g/cc) |
|---|---|---|
| Example 80 | WA1 | 1.7 |
| Example 81 | WA2 | 1.7 |
| Example 82 | WA3 | 1.7 |
| Example 83 | WA4 | 1.7 |
| Example 84 | WA5 | 1.7 |
| Example 85 | WA6 | 1.7 |
| Example 86 | WA7 | 1.7 |
| Example 87 | WA8 | 1.7 |
| Example 88 | WA9 | 1.7 |
| Example 89 | WA10 | 1.7 |
| Example 90 | WA11 | 1.7 |
| Example 91 | WA12 | 1.7 |
| Example 92 | WB4 | 1.7 |
| Example 93 | WC4 | 1.7 |
| Example 94 | WD4 | 1.7 |
| Example 95 | WA13 | 1.7 |
| Example 96 | WA14 | 1.7 |
| Example 97 | WA15 | 1.7 |
| Example 98 | WA25 | 1.7 |
| Example 99 | WA26 | 1.7 |
| Example 100 | WC27 | 1.7 |
| Example 101 | WA28 | 1.7 |

TABLE 8-continued

| | | |
|---|---|---|
| Comparative Example 20 | WE4 | 1.7 |
| Comparative Example 21 | WF4 | 1.7 |
| Comparative Example 22 | WA17 | 1.7 |
| Comparative Example 23 | WA18 | 1.7 |
| Comparative Example 24 | WA19 | 1.7 |
| | Positive electrode | Positive electrode density (g/cc) |
| Example 102 | A20 | 3.2 |
| Example 103 | A21 | 3.2 |
| Example 104 | A22 | 3.2 |
| Example 105 | A23 | 3.2 |
| Comparative Example 25 | A24 | 3.2 |

Example 106

The negative electrode (WA1) and the standard positive electrode were punch out into 50 mm×45 mm, and 45 mm×40 mm, respectively, and a separator (porous polypropylene film) inserted therebetween was inserted into an aluminum laminated bag and dried in an electric oven at 60° C. for 1 hour. Then, 2 mL of an electrolytic solution (a nonaqueous electrolytic solution obtained by preparing a mixed solvent obtained by mixing ethylene carbonate, ethyl methyl carbonate and dimethyl carbonate at a ratio of 3:5:2 (volume ratio), additionally adding 1 part by mass of vinylene carbonate (VC) and fluoroethylene carbonate (FEC) as additives with respect to 100 parts by mass of the mixed solvent and then dissolving $LiPF_6$ at a concentration of 1 M) was injected into a glove box filled with argon gas, and the aluminum laminated bag was then sealed to produce a laminate type lithium ion secondary battery (WA1).

(Examples 107 to 127), (Comparative Examples 26 to 30)

Laminate type lithium ion secondary batteries (WA2 to WA19) were produced in the same method except that the negative electrode was changed as listed in Table 9.

Example 128

The standard negative electrode and the positive electrode (A20) were punch out into 50 mm×45 mm and 45 mm×40 mm, respectively, and a separator (porous polypropylene film) inserted therebetween was inserted into an aluminum laminated bag and dried in an electric oven at 60° C. for 1 hour. Then, 2 mL of an electrolytic solution (a nonaqueous electrolytic solution obtained by preparing a mixed solvent obtained by mixing ethylene carbonate, ethyl methyl carbonate and dimethyl carbonate at a ratio of 3:5:2 (volume ratio), additionally adding 1 part by mass of vinylene carbonate (VC) and fluoroethylene carbonate (FEC) as additives with respect to 100 parts by mass of the mixed solvent and then dissolving $LiPF_6$ at a concentration of 1 M) was injected into a glove box filled with argon gas, and the aluminum laminated bag was then sealed to produce a laminate type lithium ion secondary battery (A20).

(Examples 129 to 131), (Comparative Example 31)

Laminate type lithium ion secondary batteries (A21 to A24) were produced in the same method except that the positive electrode was changed as listed in Table 9.

TABLE 9

| | Laminate type lithium ion secondary battery | Negative electrode | Positive electrode |
|---|---|---|---|
| Example 106 | WA1 | WA1 | standard positive electrode |
| Example 107 | WA2 | WA2 | standard positive electrode |
| Example 108 | WA3 | WA3 | standard positive electrode |
| Example 109 | WA4 | WA4 | standard positive electrode |
| Example 110 | WA5 | WA5 | standard positive electrode |
| Example 111 | WA6 | WA6 | standard positive electrode |
| Example 112 | WA7 | WA7 | standard positive electrode |
| Example 113 | WA8 | WA8 | standard positive electrode |
| Example 114 | WA9 | WA9 | standard positive electrode |
| Example 115 | WA10 | WA10 | standard positive electrode |
| Example 116 | WA11 | WA11 | standard positive electrode |
| Example 117 | WA12 | WA12 | standard positive electrode |
| Example 118 | WB4 | WB4 | standard positive electrode |
| Example 119 | WC4 | WC4 | standard positive electrode |
| Example 120 | WD4 | WD4 | standard positive electrode |
| Example 121 | WA13 | WA13 | standard positive electrode |
| Example 122 | WA14 | WA14 | standard positive electrode |
| Example 123 | WA15 | WA15 | standard positive electrode |
| Example 124 | WA25 | WA25 | standard positive electrode |
| Example 125 | WA26 | WA26 | standard positive electrode |
| Example 126 | WC27 | WC27 | standard positive electrode |
| Example 127 | WA28 | WA28 | standard positive electrode |
| Comparative Example 26 | WE4 | WE4 | standard positive electrode |
| Comparative Example 27 | WF4 | WF4 | standard positive electrode |
| Comparative Example 28 | WA17 | WA17 | standard positive electrode |
| Comparative Example 29 | WA18 | WA18 | standard positive electrode |
| Comparative Example 30 | WA19 | WA19 | standard positive electrode |
| | Laminate type lithium ion secondary battery | Positive electrode | Negative electrode |
| Example 128 | A20 | A20 | standard negative electrode |
| Example 129 | A21 | A21 | standard negative electrode |
| Example 130 | A22 | A22 | standard negative electrode |
| Example 131 | A23 | A23 | standard negative electrode |
| Comparative Example 31 | A24 | A24 | standard negative electrode |

Table 10 shows the evaluation results of the laminate type lithium ion secondary batteries produced in Examples 106 to 131, and Comparative Examples 26 to 31. Regarding the rate property, the rate property was evaluated as ◎ (very good) when it was 80% or more, O (good) when it was 70% or more and less than 80%, Δ (acceptable) when it was 60% or more and less than 70%, and x (poor) when it was less than 60%. Regarding the cycle property, the cycle property was evaluated as ◎ (very good) when it was 90% or more, O (good) when it was 85% or more and less than 90%, Δ (acceptable) when it was 80% or more and less than 85%, and – (poor) when it was less than 80%.

TABLE 10

| | Laminate type lithium ion secondary battery | Rate property | Cycle property | Negative electrode | Positive electrode |
|---|---|---|---|---|---|
| Example 129 | WA1 | ○ | ○ | WA1 | standard positive electrode |
| Example 130 | WA2 | ○ | ◎ | WA2 | standard positive electrode |
| Example 131 | WA3 | ◎ | ◎ | WA3 | standard positive electrode |
| Example 132 | WA4 | ◎ | ◎ | WA4 | standard positive electrode |
| Example 133 | WA5 | ○ | ◎ | WA5 | standard positive electrode |
| Example 134 | WA6 | ○ | ○ | WA6 | standard positive electrode |
| Example 135 | WA7 | ◎ | ◎ | WA7 | standard positive electrode |
| Example 136 | WA8 | ○ | ○ | WA8 | standard positive electrode |
| Example 137 | WA9 | Δ | ○ | WA9 | standard positive electrode |
| Example 138 | WA10 | ◎ | ◎ | WA10 | standard positive electrode |
| Example 139 | WA11 | ◎ | ○ | WA11 | standard positive electrode |
| Example 140 | WA12 | Δ | ○ | WA12 | standard positive electrode |
| Example 141 | WB4 | ○ | ◎ | WB4 | standard positive electrode |
| Example 142 | WC4 | ◎ | ◎ | WC4 | standard positive electrode |
| Example 143 | WD4 | ○ | ○ | WD4 | standard positive electrode |
| Example 144 | WA13 | ○ | ○ | WA13 | standard positive electrode |
| Example 145 | WA14 | ◎ | ◎ | WA14 | standard positive electrode |
| Example 146 | WA15 | ◎ | ○ | WA15 | standard positive electrode |
| Example 147 | WA25 | ○ | ◎ | WA25 | standard positive electrode |
| Example 148 | WA26 | ○ | ◎ | WA26 | standard positive electrode |
| Example 149 | WC27 | ◎ | ◎ | WC27 | standard positive electrode |
| Example 150 | WA28 | ◎ | ○ | WA28 | standard positive electrode |
| Comparative Example 26 | WE4 | X | X | WE4 | standard positive electrode |
| Comparative Example 27 | WF4 | X | X | WF4 | standard positive electrode |
| Comparative Example 28 | WA17 | Δ | X | WA17 | standard positive electrode |
| Comparative Example 29 | WA18 | Δ | X | WA18 | standard positive electrode |
| Comparative Example 30 | WA19 | Δ | X | WA19 | standard positive electrode |

TABLE 10-continued

| | Laminate type lithium ion secondary battery | Rate property | Cycle property | Positive electrode | Negative electrode |
|---|---|---|---|---|---|
| Example 151 | A20 | ◎ | ○ | A20 | standard negative electrode |
| Example 152 | A21 | ◎ | ◎ | A21 | standard negative electrode |
| Example 153 | A22 | ◎ | ◎ | A22 | standard negative electrode |
| Example 154 | A23 | ◎ | ◎ | A23 | standard negative electrode |
| Comparative Example 31 | A24 | X | X | A24 | standard negative electrode |

In the above examples, the carbon nanotube dispersion containing carbon nanotubes, a dispersing agent, and a solvent, which is a carbon nanotube dispersion in which the G/D ratio of the carbon nanotubes was 5 to 100, and the content of the dispersing agent with respect to 100 parts by mass of the carbon nanotubes was 30 parts by mass or more and less than 250 parts by mass, and which is a carbon nanotube dispersion in which the complex elastic modulus of the carbon nanotube dispersion at 25° C. and a frequency of 1 Hz was 5 Pa or more and less than 650 Pa, and the phase angle was 5° or more and less than 50° was used. In the examples, the adhesion of the electrode tended to be improved as compared with the comparative examples. In addition, a lithium ion secondary battery having an excellent rate property and cycle property was obtained according to improved conductivity and electrode strength. Therefore, it can be clearly understood that the present invention can provide a lithium ion secondary battery having a high capacity, high output and high durability that cannot be realized with conventional carbon nanotube dispersions.

While the present invention has been described above with reference to the embodiments, the present invention is not limited to the above description. For the configuration and details of the present invention, various changes that can be understood by those skilled in the art can be made within the scope of the invention.

The disclosure of the present application relates to Japanese Patent Application No. 2020-171017, filed Oct. 9, 2020, and Japanese Patent Application No. 2021-160281, filed Sep. 30, 2021, the content of which is incorporated herein by reference.

The invention claimed is:

1. A carbon nanotube dispersion containing carbon nanotubes, a dispersing agent, and a solvent, which satisfies the following (1) to (4):

(1) in Raman spectrums of carbon nanotubes, when a maximum peak intensity in a range of 1,560 $cm^{-1}$ to 1,600 $cm^{-1}$ is G, and a maximum peak intensity in a range of 1,310 $cm^{-1}$ to 1,350 $cm^{-1}$ is D, a G/D ratio of the carbon nanotubes is 10 to 50;

(2) a content of the dispersing agent with respect to 100 parts by mass of the carbon nanotubes is 30 parts by mass or more and less than 250 parts by mass;

(3) a complex elastic modulus of the carbon nanotube dispersion at 25° C. and a frequency of 1 Hz is 5 Pa or more and less than 650 Pa, and a phase angle is 50 or more and less than 500; and (4) a BET specific surface area of the carbon nanotubes is 550 $m^2/g$ to 1,200 $m^2/g$, wherein a cumulative particle size D10 measured by a dynamic light scattering method is 200 nm or more and less than 500 nm.

2. The carbon nanotube dispersion according to claim 1, wherein, when a shear rate of 1 s·1 of the carbon nanotube dispersion at 25° C. is measured using a rheometer, it is 5 Pa·s or more and less than 40 Pa·s.

3. The carbon nanotube dispersion according to claim 1, wherein a volume resistivity of the carbon nanotubes is $1.0\times10^{-3}$ Ω·cm to $1.0\times10^{-2}$ Ω·cm.

4. The carbon nanotube dispersion according to claim 1, wherein a cumulative particle size D50 measured by the dynamic light scattering method is 500 nm or more and less than 3,000 nm.

5. The carbon nanotube dispersion according to claim 1, wherein a weight average molecular weight of the dispersing agent is 10,000 to 100,000.

6. The carbon nanotube dispersion according to claim 1, wherein the solvent includes water.

7. A carbon nanotube resin composition comprising the carbon nanotube dispersion according to claim 1 and a binder.

8. A mixture slurry comprising the carbon nanotube resin composition according to claim 7 and an active material.

9. An electrode film that is a coating film of the mixture slurry according to claim 8.

10. A nonaqueous electrolyte secondary battery comprising a positive electrode, a negative electrode, and an electrolyte, wherein at least one of the positive electrode and the negative electrode includes the electrode film according to claim 9.

11. The carbon nanotube dispersion according to claim 1, wherein an average outer diameter of the carbon nanotubes is 0.5 nm to 5 nm.

* * * * *